US012462760B2

United States Patent

Kim et al.

(10) Patent No.: US 12,462,760 B2

(45) Date of Patent: Nov. 4, 2025

(54) DRIVING CIRCUIT

(71) Applicant: Samsung Display Co., Ltd., Yongin-si (KR)

(72) Inventors: Kyungho Kim, Yongin-si (KR); Sangyong No, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/614,544

(22) Filed: Mar. 22, 2024

(65) Prior Publication Data

US 2024/0321217 A1 Sep. 26, 2024

(30) Foreign Application Priority Data

Mar. 24, 2023 (KR) ........................ 10-2023-0038986
Aug. 8, 2023 (KR) ........................ 10-2023-0103700

(51) Int. Cl.
*G09G 3/3266* (2016.01)

(52) U.S. Cl.
CPC ... *G09G 3/3266* (2013.01); *G09G 2310/0289* (2013.01); *G09G 2310/08* (2013.01)

(58) Field of Classification Search
CPC ......... G09G 3/3266; G09G 2310/0286; G09G 2310/0267; G09G 3/3233
See application file for complete search history.

(56) References Cited

U.S. PATENT DOCUMENTS 10,079,598 B2 9/2018 Park et al.
10,109,252 B2 10/2018 Cho et al.
11,227,552 B2 * 1/2022 Kim ..................... G09G 3/3258
2022/0208109 A1 * 6/2022 Seo ...................... G09G 3/3233

FOREIGN PATENT DOCUMENTS

KR 20200071206 A * 6/2020
KR 10-2174833 B1 11/2020
KR 10-2287194 B1 8/2021
KR 10-2313978 B1 10/2021

* cited by examiner

*Primary Examiner* — Koosha Sharifi-Tafreshi
(74) *Attorney, Agent, or Firm* — Womble Bond Dickinson (US) LLP

(57) ABSTRACT

A driving circuit includes stages, each of the stages including: a first control circuit connected to a first voltage input terminal and a second voltage input terminal, and to control voltage levels of a first control node, a second control node, and a third control node; a first output circuit connected to a first clock terminal and a third voltage input terminal, and to output a first output signal according to the voltage levels of the first control node and the second control node; a second output circuit connected to a second clock terminal and the second voltage input terminal, and to output a second output signal according to the voltage levels of the third control node and the second control node; and a boosting circuit connected to a third clock terminal and the second voltage input terminal, and to boost the voltage level of the first control node.

20 Claims, 17 Drawing Sheets

DRIVING CIRCUIT

CROSS-REFERENCE TO RELATED APPLICATIONS

The present application claims priority to and the benefit of Korean Patent Application No. 10-2023-0038986, filed on Mar. 24, 2023, and Korean Patent Application No. 10-2023-0103700, filed on Aug. 8, 2023, in the Korean Intellectual Property Office, the entire disclosures of all of which are incorporated by reference herein.

BACKGROUND

1. Field

Aspects of one or more embodiments of the present disclosure relate to a driving circuit configured to output a gate signal, and a display apparatus including the driving circuit.

2. Description of the Related Art

A display apparatus includes a pixel portion including a plurality of pixels, a gate driving circuit, a data driving circuit, a controller, and the like. The gate driving circuit may include stages connected to gate lines. The stages may supply gate signals to the gate lines connected to the stages, in response to signals from the controller.

The above information disclosed in this Background section is for enhancement of understanding of the background of the present disclosure, and therefore, it may contain information that does not constitute prior art.

SUMMARY

One or more embodiments of the present disclosure are directed to a driving circuit configured to stably output a gate signal, and a display apparatus including the driving circuit. However, the aspects and features of the present disclosure are not limited thereto.

The above and additional aspects and features of the present disclosure will be set forth, in part, in the description that follows, and in part, will be apparent from the description, or may be learned by practicing one or more of the presented embodiments of the present disclosure.

According to one or more embodiments of the present disclosure, a driving circuit includes a plurality of stages, each of the plurality of stages including: a first control circuit connected to a first voltage input terminal configured to receive a first voltage and a second voltage input terminal configured to receive a second voltage lower than the first voltage, the first control circuit being configured to control voltage levels of a first control node, a second control node, and a third control node; a first output circuit connected to a first clock terminal and a third voltage input terminal configured to receive a third voltage, the first output circuit being configured to output a first output signal according to the voltage levels of the first control node and the second control node; a second output circuit connected to a second clock terminal and the second voltage input terminal, the second output circuit being configured to output a second output signal according to the voltage levels of the third control node and the second control node; and a boosting circuit connected to a third clock terminal and the second voltage input terminal, the boosting circuit being configured to boost the voltage level of the first control node. The second voltage is lower than the third voltage.

In an embodiment, the first control circuit may include: a first transistor connected to a first input terminal configured to receive a start signal and the first control node, the first transistor including a gate connected to the first input terminal; a second transistor connected to the first control node and the second voltage input terminal, the second transistor including a gate connected to the second control node; and a third transistor connected to the first control node and the second voltage input terminal, the third transistor including a gate connected to a second input terminal configured to receive the second output signal that may be output by a next stage from among the plurality of stages.

In an embodiment, the start signal may be the second output signal that may be output by a previous stage from among the plurality of stages.

In an embodiment, the first control circuit may include: a fourth transistor connected to the second control node and the second voltage input terminal, the fourth transistor including a gate connected to the first control node; and a fifth transistor connected to the first voltage input terminal and the second control node, the fifth transistor including a gate connected to a second input terminal configured to receive the second output signal that may be output by a next stage from among the plurality of stages.

In an embodiment, the first control circuit may include: a sixth transistor connected to the first voltage input terminal and the third control node, the sixth transistor including a gate connected to a first input terminal configured to receive the second output signal that may be output by a previous stage from among the plurality of stages; and a seventh transistor connected to the third control node and the second voltage input terminal, the seventh transistor including a gate connected to the second control node.

In an embodiment, the first control circuit may include: an eighth transistor including a first sub-transistor and a second sub-transistor connected in series between a first input terminal configured to receive the second output signal that may be output by a previous stage from among the plurality of stages and the third control node, the first sub-transistor and the second sub-transistor including gates connected to the first input terminal; a ninth transistor connected to an intermediate node between the first sub-transistor and the second sub-transistor of the eighth transistor and the first voltage input terminal, the ninth transistor including a gate connected to a node of the boosting circuit; and a tenth transistor connected to the third control node and the second voltage input terminal, the tenth transistor including a gate connected to the second control node.

In an embodiment, the boosting circuit may include: an eighth transistor connected to the third clock terminal and a first node, the eighth transistor including a gate connected to the first control node; a ninth transistor connected to the first node and the second voltage input terminal, the ninth transistor including a gate connected to the second control node; and a first capacitor connected to the first control node and the first node.

In an embodiment, the first output circuit may include a plurality of sub-output circuits configured to output a plurality of first output signals, the first clock terminal of each of the plurality of sub-output circuits may be configured to receive one of a plurality of first clock signals, and the plurality of first clock signals may have the same waveform as each other and may have phases shifted by an interval from one another.

In an embodiment, a period during which a third clock signal that may be input to the third clock terminal is a first level voltage may overlap with periods during which the plurality of first clock signals may be the first level voltage.

In an embodiment, the second output circuit may include: a tenth transistor connected to the second clock terminal and an output terminal configured to output the second output signal, the tenth transistor including a gate connected to the third control node; an eleventh transistor connected to the output terminal and the second voltage input terminal, the eleventh transistor including a gate connected to the second control node; and a second capacitor connected to the third control node and the output terminal.

In an embodiment, each of the plurality of stages may further include a second control circuit connected to the first voltage input terminal and the first control node, the second control circuit being configured to control the voltage level of the first control node during a sensing period of a frame including a display period and the sensing period.

In an embodiment, the second control circuit may include: a second capacitor connected to the first voltage input terminal and a sensing node; a twelfth transistor connected to the sensing node and an output terminal configured to output the second output signal, the twelfth transistor including a first sub-transistor and a second sub-transistor that are connected in series; a thirteenth transistor connected to the first voltage input terminal and an intermediate node between the first sub-transistor and the second sub-transistor of the twelfth transistor, the thirteenth transistor including a gate connected to the sensing node; and a fourteenth transistor connected to the thirteenth transistor and the first control node.

In an embodiment, the twelfth transistor may be configured to be turned on by a first control signal synchronized to the second output signal that may be output during the display period, and set a voltage of the sensing node as a voltage of the second output signal.

In an embodiment, the fourteenth transistor may be configured to be turned on by a second control signal that may be input during the sensing period, and set a voltage of the first control node as the first voltage transmitted through the thirteenth transistor that may be turned on.

In an embodiment, each of the plurality of stages may further include: a fifteenth transistor connected to the first control node and the second voltage input terminal, the fifteenth transistor including a gate connected to a terminal configured to receive a third control signal; and a sixteenth transistor connected to the first voltage input terminal and the second control node, the sixteenth transistor including a gate connected to the terminal configured to receive the third control signal.

According to one or more embodiments of the present disclosure, a driving circuit includes a plurality of stages, each of the plurality of stages including: a first output circuit configured to output a first output signal, and including a first pull-up transistor and a first pull-down transistor, the first pull-up transistor including a gate connected to a first control node, and the first pull-down transistor including a gate connected to a second control node; a second output circuit configured to output a second output signal, and including a second pull-up transistor and a second pull-down transistor, the second pull-up transistor including a gate connected to a third control node, and the second pull-down transistor including a gate connected to the second control node; a boosting circuit configured to boost a voltage level of the first control node; and a control circuit configured to control the voltage level of the first control node, a voltage level of the second control node, and a voltage level of the third control node, the control circuit including: a first transistor connected to a first input terminal configured to receive a start signal and the first control node, the first transistor including a gate connected to the first input terminal; a second transistor connected to a first voltage input terminal configured to receive a first voltage and the second control node, the second transistor including a gate connected to a second input terminal configured to receive the second output signal that is output by a next stage from among the plurality of stages; and a third transistor connected to the first voltage input terminal and the third control node, the third transistor including a gate connected to the first input terminal.

In an embodiment, the control circuit may further include: a fourth transistor connected to the first control node and a second voltage input terminal configured to receive a second voltage lower than the first voltage, the fourth transistor including a gate connected to the second control node; a fifth transistor connected to the first control node and the second voltage input terminal, the fifth transistor including a gate connected to the second input terminal; a sixth transistor connected to the second control node and the second voltage input terminal, the sixth transistor including a gate connected to the first control node; and a seventh transistor connected to the third control node and the second voltage input terminal, the seventh transistor including a gate connected to the second control node.

According to one or more embodiments of the present disclosure, a driving circuit includes a plurality of stages, each of the plurality of stages including: a first output circuit configured to output a first output signal, and including a first pull-up transistor and a first pull-down transistor, the first pull-up transistor including a gate connected to a first control node, and the first pull-down transistor including a gate connected to a second control node; a second output circuit configured to output a second output signal, and including a second pull-up transistor and a second pull-down transistor, the second pull-up transistor including a gate connected to a third control node, and the second pull-down transistor including a gate connected to the second control node; a boosting circuit configured to boost a voltage level of the first control node; and a control circuit configured to control the voltage level of the first control node, a voltage level of the second control node, and a voltage level of the third control node, the control circuit including: a first transistor connected to a first input terminal configured to receive a start signal and the first control node, the first transistor including a gate connected to the first input terminal; a second transistor connected to a first voltage input terminal configured to receive a first voltage and the second control node, the second transistor including a gate connected to a second input terminal configured to receive the second output signal that is output by a next stage from among the plurality of stages; and a third transistor connected to the first input terminal and the third control node, the third transistor including a gate connected to the first input terminal.

In an embodiment, the control circuit may further include: a fourth transistor connected to the first control node and a second voltage input terminal configured to receive a second voltage lower than the first voltage, the fourth transistor including a gate connected to the second control node; a fifth transistor connected to the first control node and the second voltage input terminal, the fifth transistor including a gate connected to the second input terminal; a sixth transistor connected to the second control node and the second voltage input terminal, the sixth transistor including a gate connected to the first control node; and a seventh transistor connected to the third control node and the second voltage input terminal, the seventh transistor including a gate connected to the second control node.

In an embodiment, each of the first transistor, the third transistor, and the sixth transistor may include a first sub-transistor and a second sub-transistor that are connected in series, and the control circuit may further include: an eighth transistor connected between the first voltage input terminal and an intermediate node between the first sub-transistor and the second sub-transistor of the first transistor, the eighth transistor including a gate connected to a node of the boosting circuit; a ninth transistor connected between the first voltage input terminal and an intermediate node between the first sub-transistor and the second sub-transistor of the sixth transistor, the ninth transistor including a gate connected to the second control node; and a tenth transistor connected between the first voltage input terminal and an intermediate node between the first sub-transistor and the second sub-transistor of the third transistor, the tenth transistor including a gate connected to a node of the boosting circuit.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
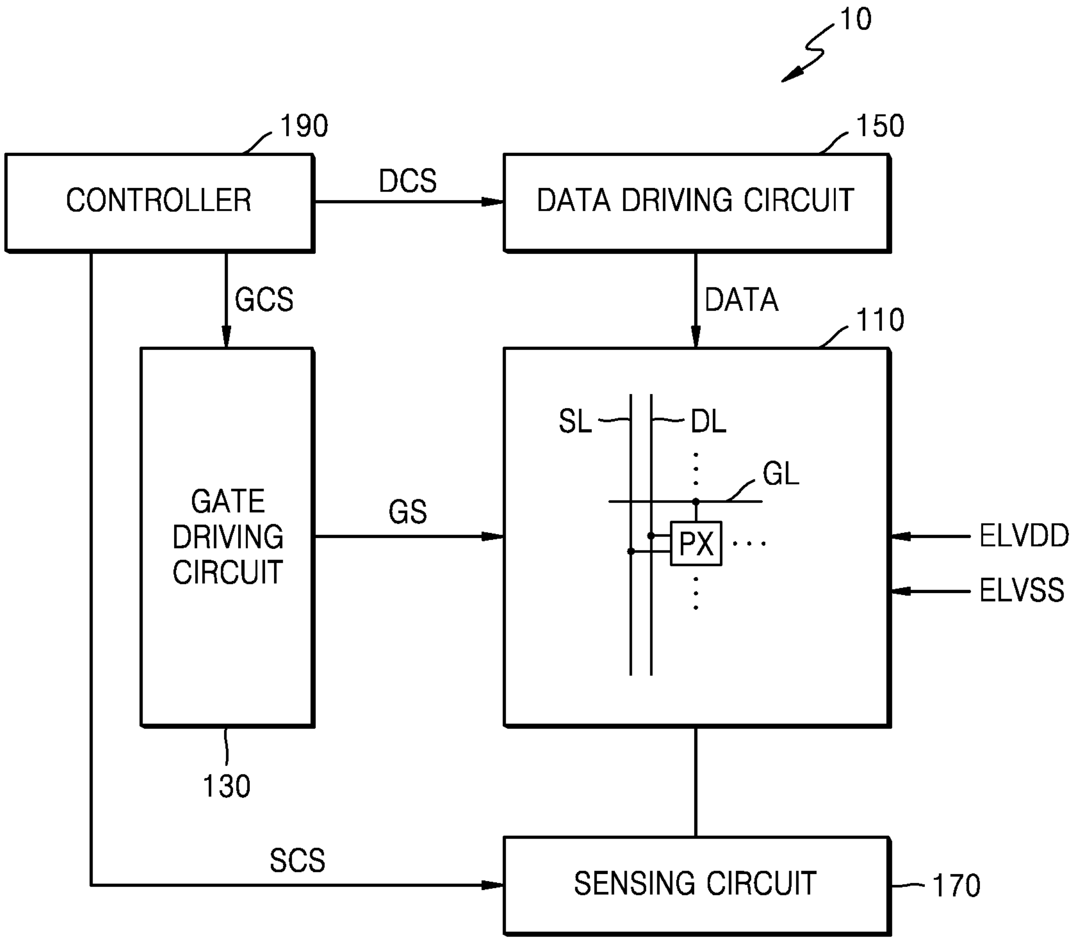
FIG. 1 is a diagram schematically showing a display apparatus according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-direction, the y-direction, and the z-direction are not limited to three axes of the rectangular coordinate system, and may be interpreted in a broader sense. For example, the x-direction, the y-direction, and the z-direction may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements (e.g., a switch, a transistor, a capacitance device, an inductor, a resistance device, a diode, and/or the like) therebetween. In addition, it will also be understood that when an element or layer is referred to as being "between" two elements or layers, it can be the only element or layer between the two elements or layers, or one or more intervening elements or layers may also be present.

As used herein, the terms "on" and "off" used in relation to a device state refer to an activated state of the device and a non-activated state of the device, respectively. The terms "on" and "off" used in relation to a signal received by a device may refer to signals configured to activate the device and deactivate the device, respectively. The device may be activated by a high-level voltage or a low-level voltage. For example, a P-channel transistor (a P-type transistor) may be activated by a low-level voltage, and an N-channel transistor (an N-type transistor) may be activated by a high-level voltage. Thus, it shall be understood that "on" voltages with respect to the P-type transistor and the N-type transistor may be opposite voltages (e.g., low versus high) to each other.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

A display apparatus according to some embodiments may display a motion image or a static image. The display apparatus may be used as a display screen of various suitable products including various suitable portable electronic devices, such as a mobile phone, a smartphone, a tablet personal computer (PC), a mobile communication terminal, an electronic notebook, an electronic book, a portable multimedia player (PMP), a navigation device, and a ultra mobile PC (UMPC), as well as a television (TV), a notebook computer, a monitor, a signboard, an Internet of things device, and the like. Also, the display apparatus according to some embodiments may be used in wearable devices, such as a smart watch, a watch phone, a glasses-type display, and a head-mounted display (HMD). Also, the display apparatus according to some embodiments may be used as a center information display (CID) on a gauge of a vehicle, a center fascia or a dashboard of the vehicle, a room mirror display substituting for a side-view mirror of the vehicle, or a display disposed on a rear surface of a front seat of the vehicle, as an entertainment device for a user in a backseat of the vehicle. Also, the display apparatus may be a flexible apparatus.

FIG. 1 is a diagram schematically showing a display apparatus 10 according to an embodiment.

Referring to FIG. 1, the display apparatus 10 may include a pixel portion 110, a gate driving circuit 130, a data driving circuit 150, a sensing circuit 170, and a controller 190.

The pixel portion 110 may be provided in a display area. In a peripheral area outside the display area, various conductive lines configured to transmit an electrical signal to be applied to the display area, external driving circuits electrically connected to pixel circuits, and pads may be arranged to which a printed circuit board (PCB) or a driver integrated circuit (IC) chip is coupled. For example, in the peripheral area, the gate driving circuit 130, the data driving circuit 150, the sensing circuit 170, and the controller 190 may be provided.

A plurality of gate lines GL, a plurality of data lines DL, a plurality of sensing lines SL, and a plurality of pixels PX connected thereto, may be arranged in the pixel portion 110. The plurality of pixels PX may be arranged in various suitable arrangement forms, for example, such as a stripe form, a diamond form (e.g., a PENTILE® form, PENTILE® being a duly registered trademark of Samsung Display Co., Ltd.), a mosaic form, and/or the like, to realize an image. Each of the plurality of pixels PX may include an organic light-emitting diode as a display element (e.g., a light-emitting device), and the organic light-emitting diode may be connected to a pixel circuit. The pixel circuit may include a plurality of transistors and at least one capacitor. The pixel PX may emit, for example, red, green, blue, or white light through the organic light-emitting diode. Each pixel PX may be connected to a corresponding gate line from among the plurality of gate lines GL, a corresponding sensing line from among the plurality of sensing lines SL, and a corresponding data line from among the plurality of data lines DL.

The plurality of pixels PX may be arranged in at least one corner of the display apparatus 10 to overlap with the gate driving circuit 130. Thus, a dead space may be reduced, and the display area may be expanded.

Each of the gate lines GL may extend in the x direction (e.g., a row direction, a horizontal direction), and may be connected to the pixels PX arranged in the same corresponding row as each other. Each of the gate lines GL may be configured to transmit a gate signal to the pixels PX arranged in the same corresponding row as each other. Each of the data lines DL may extend in the y direction (e.g., a column direction, a vertical direction), and may be connected to the pixels PX arranged in the same corresponding column as each other. Each of the data lines DL may be synchronized to the gate signal, and may be configured to transmit the data signal DATA to each of the pixels PX in the same corresponding column as each other. Each of the sensing lines SL may extend in the y direction (e.g., the column direction), and may be connected to the pixels PX arranged in the same corresponding column as each other.

The gate driving circuit 130 may be connected to the plurality of gate lines GL, and configured to generate gate signals GS in response to a control signal GCS from the controller 190 to sequentially supply the gate signals to the gate lines GL. The gate line GL may be connected to a gate of a transistor included in the pixel PX. The gate signal GS may be a gate control signal configured to control the turning on and turning off of the transistor having the gate connected to the gate line GL. The gate signal GS may be a square wave signal including a gate-on voltage for turning on the transistor, and a gate-off voltage for turning off the transistor.

The data driving circuit 150 may be connected to the plurality of data lines DL, and configured to supply data signals DATA to the data lines DL in response to a control signal DCS from the controller 190. The data signal DATA supplied to the data line DL may be supplied to the pixel PX to which the gate signal is supplied. The data driving circuit 150 may convert input image data having a gradation, which is input from the controller 190, into the data signal DATA in the form of a voltage or a current.

The sensing circuit 170 may be connected to the plurality of sensing lines SL, and configured to sense, during a sensing period, state information of the pixels PX through the sensing lines SL in response to a control signal SCS from the controller 190. According to an embodiment, the sensing line SL may be provided for each vertical line (e.g., column). According to another embodiment, one sensing line SL may be shared by the pixels PX of a plurality of columns. The sensing circuit 170 may be configured to measure the state information of the pixels PX based on a current and/or a voltage fed back through the sensing lines SL. The state information may include at least one of a threshold voltage and/or a carrier mobility of a driving transistor included in the pixel PX, and/or deterioration information of an organic light-emitting diode, which is a display element. The state information of the pixel PX may be transmitted to the controller 190 and/or the data driving circuit 150, and may be used to correct the data signal DATA.

The controller 190 may be configured to generate the control signals GCS, DCS, and SCS based on signals that are input from the outside, and supply the control signals GCS, DCS, and SCS to the gate driving circuit 130, the data driving circuit 150, and the sensing circuit 170. The control signal GCS that is output to the gate driving circuit 130 may include a plurality of clock signals and a start signal. The control signal DCS that is output to the data driving circuit 150 may include a start signal and a plurality of clock signals.

The display apparatus 10 may supply a driving voltage ELVDD and a common voltage ELVSS to the pixels PX. The driving voltage ELVDD may be a high-level voltage provided to a driving transistor electrically connected to a first electrode (e.g., a pixel electrode or an anode) of the display element included in the pixel PX. The common voltage ELVSS may be a low-level voltage provided to a second electrode (e.g., an opposite electrode or a cathode) of the display element included in the pixel PX.

The display apparatus 10 may include a display panel, and the display panel may include a substrate. The pixels PX may be arranged in a display area of the substrate. Part or all of the gate driving circuit 130 may be directly formed in a peripheral area of the substrate, during a process of forming, in the display area of the substrate, the transistor included in the pixel circuit. The data driving circuit 150, the sensing circuit 170, and the controller 190 each may be formed as a separate IC chip or may be formed as a single IC chip, and may be arranged on a flexible PCB (FPCB) electrically connected to a pad arranged on a side of the substrate. According to another embodiment, the data driving circuit 150, the sensing circuit 170, and the controller 190 may be directly arranged on the substrate using a chip on glass (COG) or chip on plastic (COP) bonding method.

Hereinafter, an organic light-emitting display apparatus is described as a representative example of a display apparatus according to an embodiment. However, the present disclosure is not limited thereto. According to another embodiment, the display apparatus may include an inorganic light-emitting display apparatus, an inorganic electro-luminescence (EL) display apparatus, or a quantum dot light-emitting display apparatus.

Figure 2:
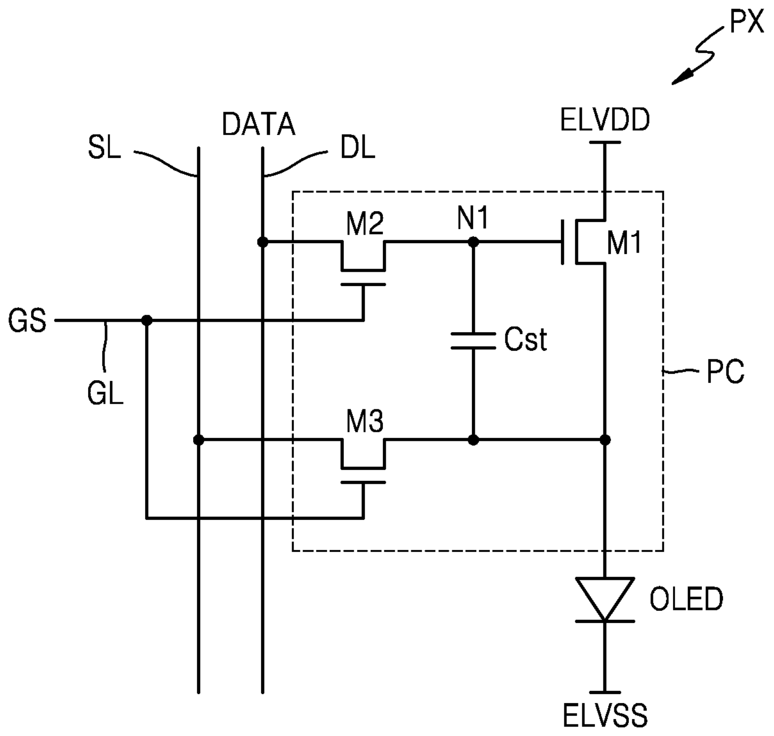
FIG. 2 is an equivalent circuit diagram of a pixel according to an embodiment.

FIG. 2 is an equivalent circuit diagram of a pixel PX according to an embodiment.

Referring to FIG. 2, each pixel PX may include a pixel circuit PC, and an organic light-emitting diode OLED as a display element connected to the pixel circuit PC. The pixel circuit PC may include a first transistor M1, a second transistor M2, a third transistor M3, and a capacitor Cst. The first transistor M1 may be a driving transistor configured to output a driving current corresponding to a data signal DATA, and the second transistor M2 and the third transistor M3 may be switching transistors configured to transmit a signal. A first terminal (e.g., a first electrode) and a second terminal (e.g., a second electrode) of each of the first to third transistors M1 to M3 may be a source or a drain according to voltages of the first and second terminals. For example, according to the voltages of the first terminal and the second terminal, the first terminal may be a drain and the second terminal may be a source, or the first terminal may be a source and the second terminal may be a drain.

The first transistor M1 may include a first terminal connected to a first power source configured to supply a driving voltage ELVDD, and a second terminal connected to a first electrode (e.g., a pixel electrode) of the organic light-emitting diode OLED. The first transistor M1 may be configured to control a driving current flowing from the first power source to the organic light-emitting diode OLED, in response to a voltage stored in the capacitor Cst. The organic light-emitting diode OLED may emit light having a desired brightness (e.g., a certain or predetermined brightness) according to the driving current.

The second transistor M2 (e.g., a write transistor) may include a gate connected to a gate line GL, a first terminal connected to a data line DL, and a second terminal connected to the gate of the first transistor M1. The second transistor M2 may be turned on by a gate signal GS supplied to the gate line GL, and may be configured to electrically connect the data line DL with the gate of the first transistor M1 to transmit a data signal DATA that is input through the data line DL to the gate of the first transistor M1.

The third transistor M3 (e.g., a sensing transistor) may include a gate connected to the gate line GL, a first terminal connected to the second terminal of the first transistor M1 and the first electrode of the organic light-emitting diode OLED, and a second terminal connected to a sensing line SL. The third transistor M3 may be turned on by the gate signal GS supplied to the gate line GL, and may be configured to electrically connect the sensing line SL with the second terminal of first transistor M1 and the first electrode of the organic light-emitting diode OLED to transmit a current and/or a voltage supplied from the second terminal of first transistor M1 to the first electrode of the organic light-emitting diode OLED to the sensing line SL.

The capacitor Cst may be connected between the gate of the first transistor M1 and the second terminal of the first transistor M1. The capacitor Cst may store a voltage corresponding to a difference between a voltage transmitted from the second transistor M2 and a voltage of the second terminal of the first transistor M1.

The organic light-emitting diode OLED may include the first electrode (e.g., the pixel electrode) connected to the second terminal of the first transistor M1, and a second electrode (e.g., an opposite electrode) connected to a second power source to which a common voltage ELVSS is applied. The organic light-emitting diode OLED may emit light having a brightness corresponding to the amount of the driving current supplied from the first transistor M1.

In FIG. 2, the transistors of the pixel circuit are illustrated as N-type transistors. However, the present disclosure is not limited thereto. For example, the transistors of the pixel circuit may include P-type transistors, or some of the transistors of the pixel circuit may include P-type transistors and the others may include N-type transistors. As such, various suitable modifications are possible.

According to an embodiment, at least the first transistor M1 may include an oxide thin-film transistor including a semiconductor layer including an amorphous or crystalline oxide semiconductor. For example, the first to third transistors M1 to M3 may include oxide thin-film transistors. The oxide thin-film transistor may have excellent off-current characteristics. The oxide semiconductor may include a Zn oxide-based material, such as Zn oxide, In—Zn oxide, Ga—In—Zn oxide, and/or the like. According to some embodiments, the oxide semiconductor may include an In—Ga—Zn—O (IGZO) semiconductor. According to some embodiments, the oxide semiconductor may include an In—Sn—Ga—Zn—O (ITGZO) semiconductor. According to an embodiment, the oxide thin-film transistor may include a low temperature polycrystalline oxide (LTPO) thin-film transistor. According to an embodiment, at least one of the first to third transistors M1 to M3 may include a low temperature polysilicon (LTPS) thin-film transistor including a semiconductor layer including polysilicon.

When a gate signal is supplied to the pixel PX through a gate line corresponding to the pixel PX during a driving period, the pixel PX may receive a data signal from a data line corresponding to the pixel PX. The pixel PX receiving the data signal may control, in response to the data signal, the amount of current flowing from a driving voltage source (i.e. the first power source described above) to a common voltage source (i.e. the second power source described above) through the organic light-emitting diode OLED. Here, the organic light-emitting diode OLED may generate light of a desired brightness (e.g., a certain or predetermined brightness) according to the amount of current.

When a gate signal is supplied to the pixel PX through the gate line corresponding to the pixel PX during a sensing period, the pixel PX may output a current and/or a voltage to the sensing line based on a sensing signal supplied through the data line corresponding to the pixel PX.

Figure 3:
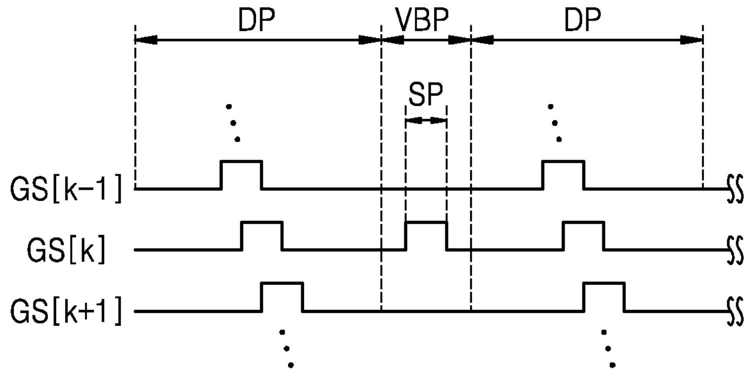
FIG. 3 is a timing diagram illustrating a driving operation of a display apparatus according to an embodiment.

FIG. 3 is a timing diagram illustrating a driving operation of a display apparatus according to an embodiment.

Referring to FIG. 3, during one frame, the display apparatus may operate in a display period DP during which an image is displayed, and in a vertical blank period VBP. Because state information of a pixel may be sensed during the vertical blank period VBP, it may be understood that the vertical blank period VBP may include a sensing period SP.

Further referring to FIG. 2, during the display period DP, the pixels PX may display an image (e.g., a predetermined image) in response to a data signal. A second transistor M2 and a third transistor M3 of the pixel PX may be turned on in response to a gate signal GS (e.g. a gate signal GS[k−1], GS[k] or GS[k+1] as shown in FIG. 3) supplied during the display period DP, and thus, a voltage between a node N1 of the pixel PX and a second terminal of a first transistor M1 may be set according to a driving current. When the gate signal GS is supplied, a data signal DATA may be supplied through a data line DL, and an initialization voltage may be supplied through a sensing line SL. According to an embodiment, the initialization voltage may be set in response to the deterioration of an organic light-emitting diode OLED. When the initialization voltage is supplied to the pixel PX during the display period DP, a desired voltage for a capacitor Cst may be charged without being affected by the deterioration of the organic light-emitting diode OLED.

The sensing period SP may be activated in an arbitrary frame according to a frame cycle (e.g., a predetermined frame cycle) or a user's setting. During the sensing period SP, an arbitrary row for pixel sensing may be selected. FIG. 3 illustrates an example in which the pixels PX in a $k^{th}$ row are sensed during the sensing period SP.

The second transistor M2 and the third transistor M3 of the pixel PX may be turned on in response to a gate signal GS supplied during the sensing period SP. When the gate signal GS is supplied, a sensing voltage for sensing the pixel may be supplied through the data line DL, and a mobility and/or a threshold voltage of the first transistor M1 may be measured through the measurement of a current and/or a voltage of the sensing line SL. According to an embodiment, the sensing voltage may include a black gradation voltage for turning off the first transistor M1. According to an embodiment, the sensing voltage may include a reference voltage (e.g., a predetermined reference voltage). The reference voltage may be set as a voltage by which the first transistor M1 may be turned on. A voltage applied to a first electrode of the organic light-emitting diode OLED may include deterioration information of the organic light-emitting diode OLED. According to various embodiments, after the sensing period SP, a period for initializing a voltage of a gate of the first transistor M1 and/or the voltage of the first electrode of the organic light-emitting diode OLED, or re-setting the same to be a voltage set before the sensing period SP, may further be provided.

Figure 4:
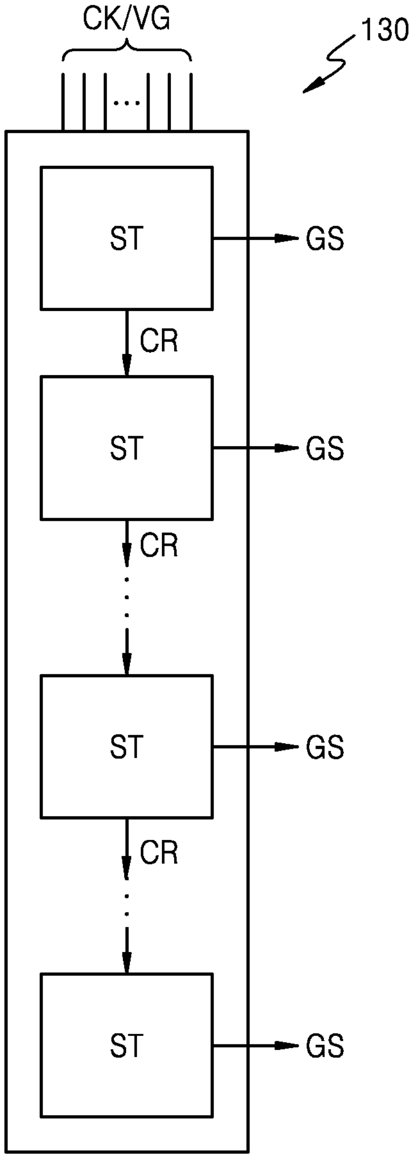
FIG. 4 is a diagram schematically showing a gate driving circuit according to an embodiment.
Figure 5:
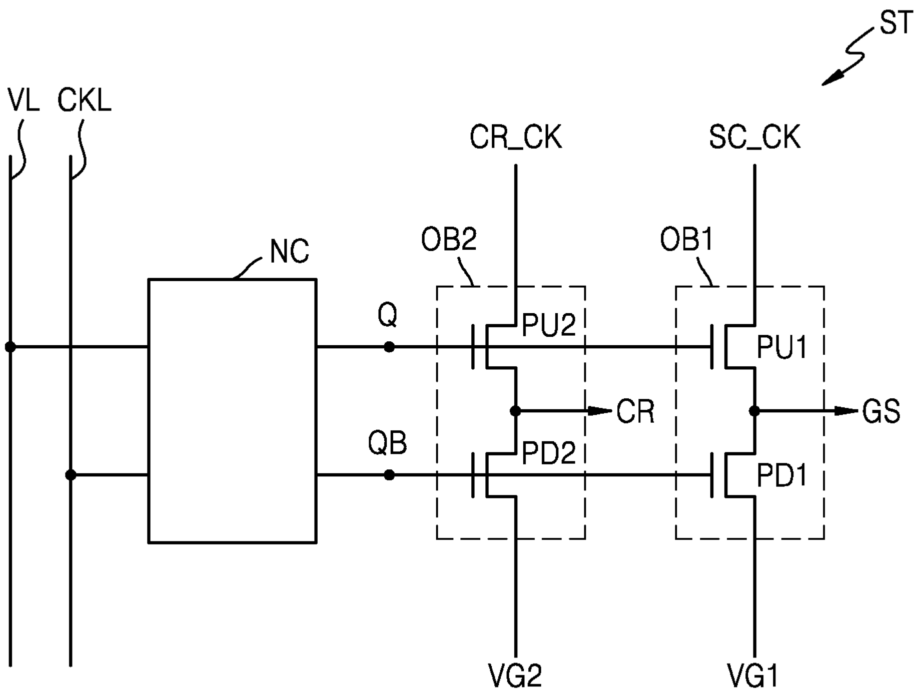
FIG. 5 is a diagram schematically showing an arbitrary stage included in a gate driving circuit according to an embodiment.
Figure 6A:
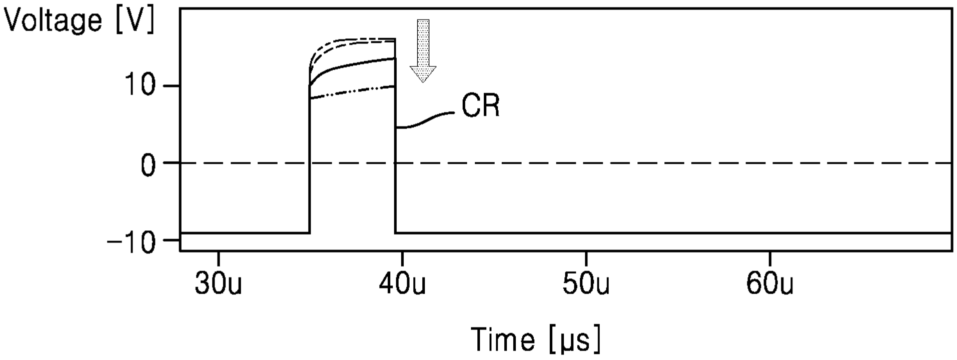
FIG. 6A is a diagram showing a change of a carry signal that is output by a stage illustrated in FIG. 5.
Figure 6B:
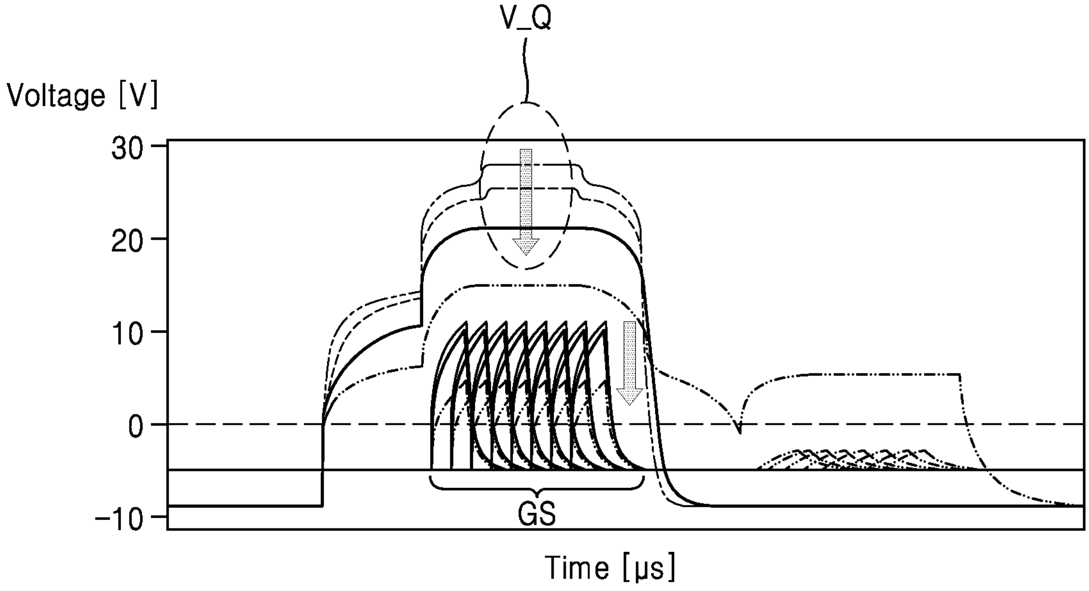
FIG. 6B is a diagram showing a change of a gate signal that is output by the stage illustrated in FIG. 5.

FIG. 4 is a diagram schematically showing the gate driving circuit 130 according to an embodiment. FIG. 5 is a diagram schematically showing an arbitrary stage included in the gate driving circuit 130 according to an embodiment. FIG. 6A is a diagram showing a change of a carry signal that is output by the stage illustrated in FIG. 5. FIG. 6B is a diagram showing a change of a gate signal that is output by the stage illustrated in FIG. 5.

The gate driving circuit 130 may include a plurality of stages ST. Each stage ST may receive at least one clock signal CK and at least one voltage signal VG, and may generate at least one gate signal GS (also referred to as a "first output signal"). The stage ST may receive the at least one clock signal CK from at least one clock line CKL (e.g. refer to FIG. 5), and may receive the at least one voltage signal VG from at least one voltage line VL (e.g. refer to FIG. 5). The stage ST may output at least one gate signal GS to at least one gate line connected to the stage ST. The stage ST may output a carry signal CR (also referred to as a "second output signal") to a previous stage and/or a next stage.

As illustrated in FIG. 5, the stage ST may include a control circuit NC configured to control a voltage level of a first control node Q and a second control node QB, a first output circuit OB1 configured to output the gate signal GS, and a second output circuit OB2 configured to output the carry signal CR. According to an embodiment, a first level voltage may be a high level voltage, and a second level voltage may be a low level voltage.

The first output circuit OB1 may include a pull-up transistor PU1 and a pull-down transistor PD1 connected between a terminal to which a scan clock signal SC_CK is input and a terminal to which a voltage VG1 of the second level voltage is input. The second output circuit OB2 may include a pull-up transistor PU2 and a pull-down transistor PD2 connected between a terminal to which a carry clock signal CR_CK is input and a terminal to which a voltage VG2 of the second level voltage is input.

The pull-up transistors PU1 and PU2 may be turned on or turned off according to a voltage level of the first control node Q. The pull-down transistors PD1 and PD2 may be turned on or turned off according to a voltage level of the second control node QB. When the first control node Q is set to be the first level voltage and the high-level voltage is continually applied to gates of the pull-up transistors PU1 and PU2 for a long period of time, a high gate-source voltage (Vgs) stress may be applied, and thus, a threshold voltage of the pull-up transistors PU1 and PU2 may be positively shifted.

For example, due to the high gate-source voltage (Vgs) stress applied to the pull-up transistor PU2 of the second output circuit OB2, an output of the carry signal CR may be reduced as illustrated in FIG. 6A. When the output of the carry signal CR is reduced, a rising of a voltage V_Q of the first control node Q of the previous stage or the next stage receiving the carry signal CR may decrease as illustrated in FIG. 6B, and an output of the gate signal GS may be reduced to cause a mal-operation of the stage ST.

Figure 7:
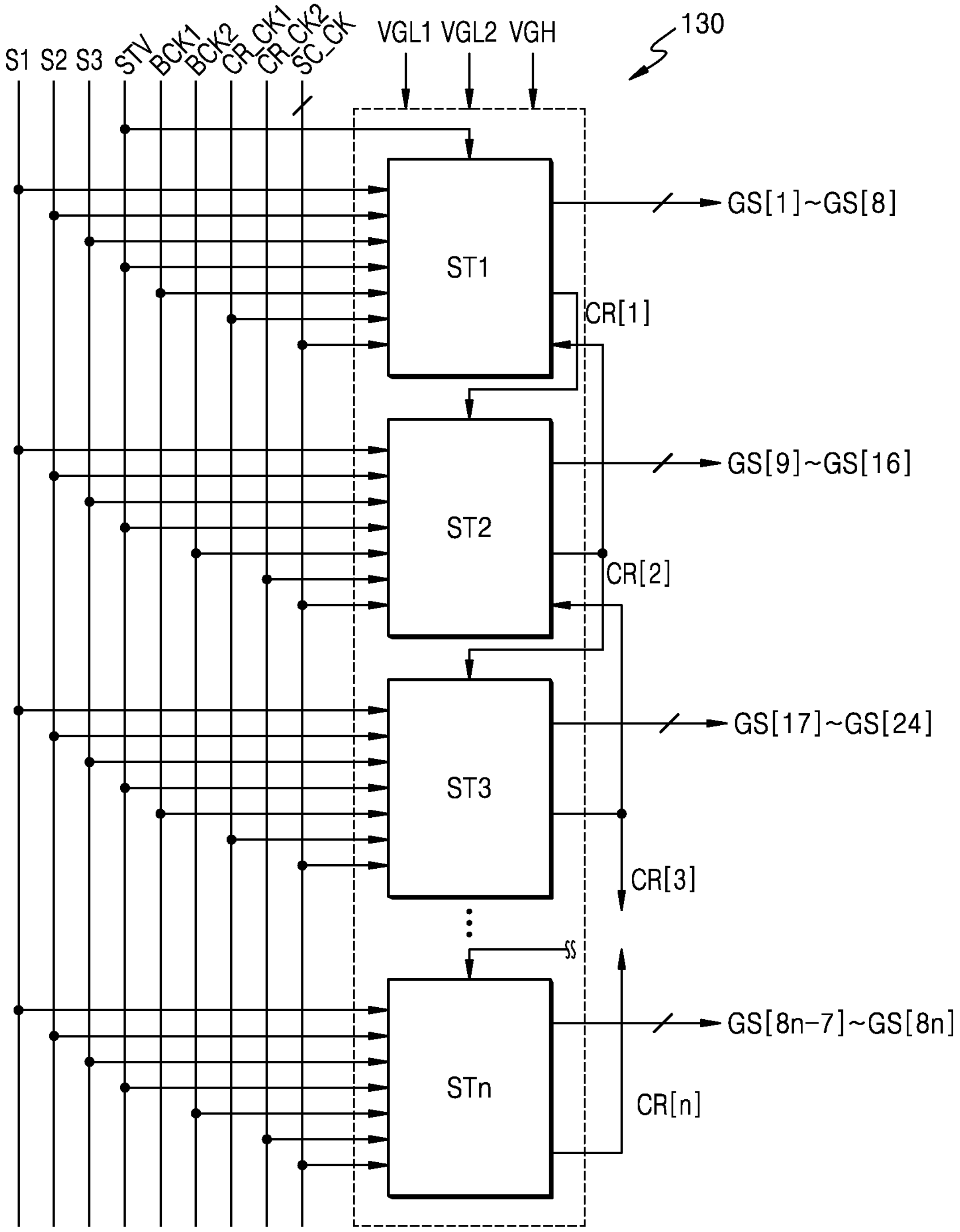
FIG. 7 is a diagram schematically showing a gate driving circuit according to an embodiment.
Figure 8:
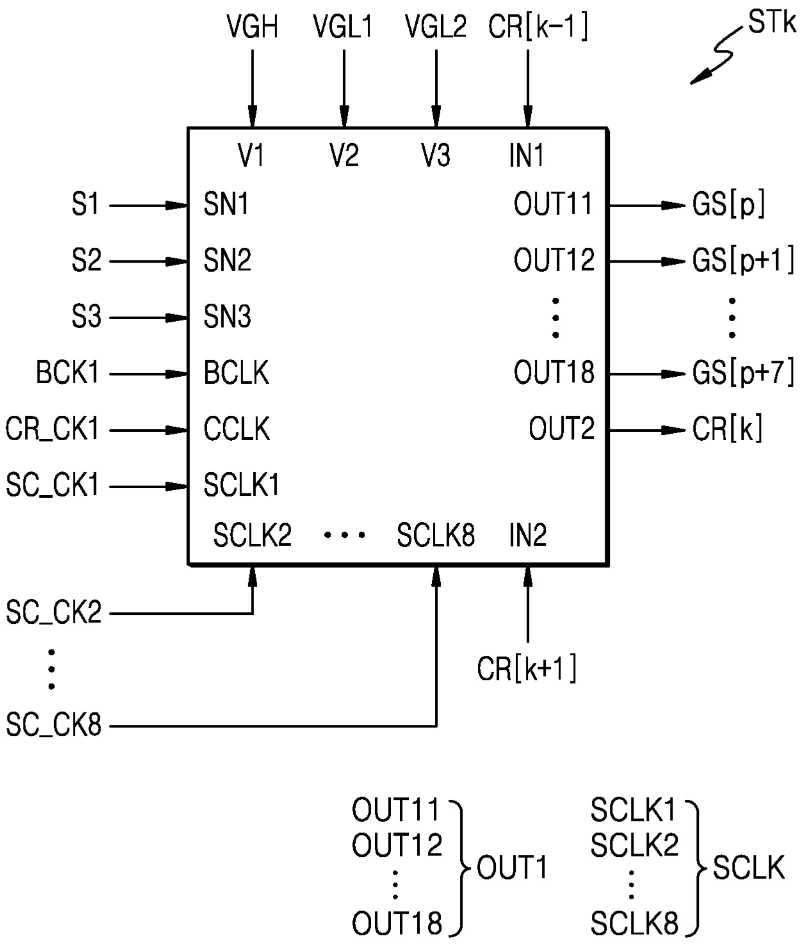
FIG. 8 is a diagram schematically showing a stage of the gate driving circuit illustrated in FIG. 7.
Figure 9:
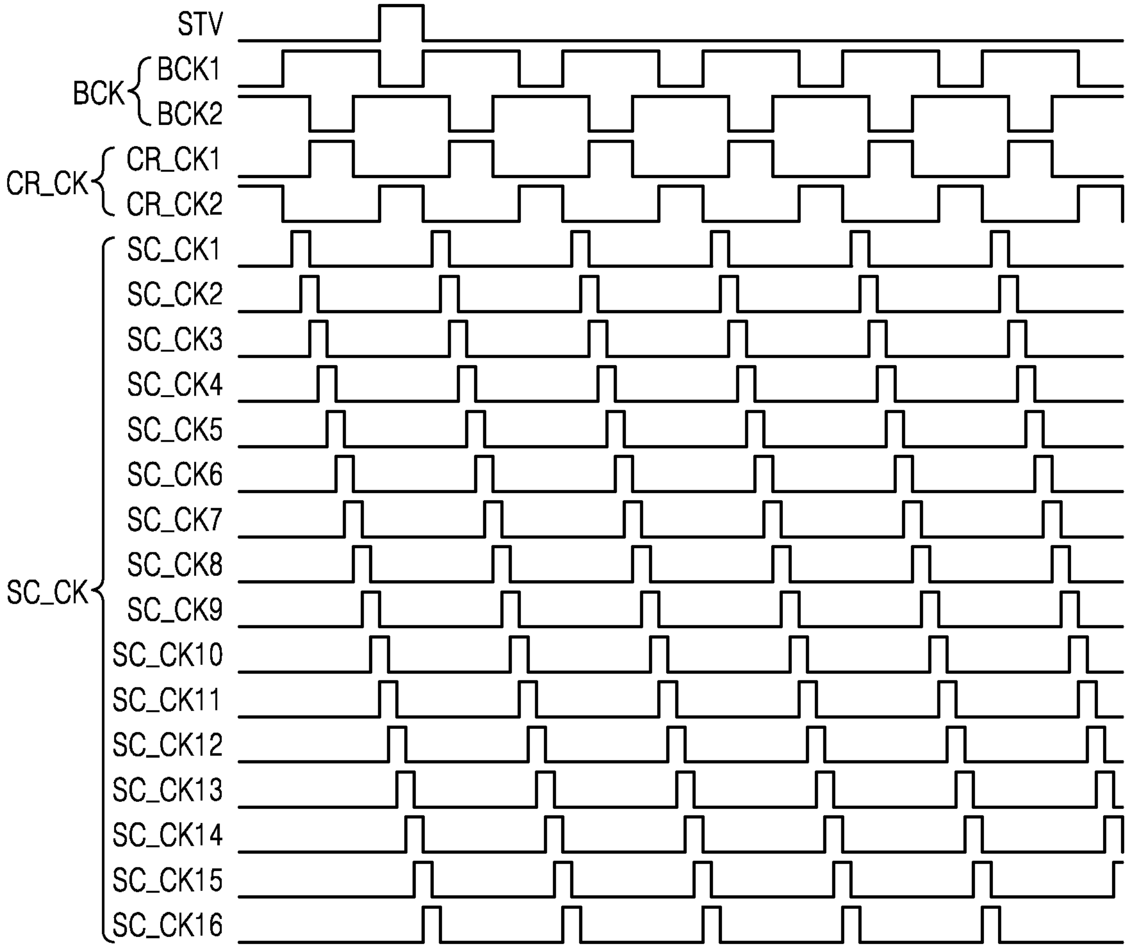
FIG. 9 is a diagram showing signals that are input to stages of the gate driving circuit illustrated in FIG. 7, and signals that are output from the stages.

FIG. 7 is a diagram schematically showing the gate driving circuit 130 according to an embodiment. FIG. 8 is a diagram schematically showing a stage of the gate driving circuit 130 illustrated in FIG. 7. FIG. 9 is a diagram showing signals that are input to stages of the gate driving circuit 130 illustrated in FIG. 7, and signals that are output from the stages.

The gate driving circuit 130 according to an embodiment may include a plurality of stages ST1 to STn (n being a positive integer). The plurality of stages ST1 to STn may sequentially output gate signals (e.g., first output signals) GS[1] to GS[8n] to the gate lines. The number of stages provided in the gate driving circuit 130 may be variously modified according to the number of rows (e.g., horizontal lines) provided in the pixel portion 110.

Each of the plurality of stages ST1 to STn of the gate driving circuit 130 according to an embodiment may generate two or more gate signals corresponding to two or more rows, and output the two or more gate signals to two or more gate lines corresponding to the correspond one of the plurality of stages ST1 to STn. According to an embodiment, as illustrated in FIG. 7, each of the plurality of stages ST1 to STn may generate eight gate signals, and sequentially output the eight gate signals to eight gate lines of eight rows corresponding to the correspond one of the plurality of stages ST1 to STn. In this case, the number of stages may be ⅛ of the number of rows (e.g., horizontal lines) provided in the pixel portion 110. For example, the first stage ST1 may sequentially output first to eighth gate signals GS[1] to GS[8] to first to eighth gate lines. The $n^{th}$ stage STn may output an $8n-7^{th}$ gate signal GS[8n−7] to an $8n^{th}$ gate signal GS[8n] to an $8n-7^{th}$ gate line to an $8n^{th}$ gate line.

Referring to FIGS. 7 and 8, each of the plurality of stages ST1 to STn of the gate driving circuit 130 may include a first input terminal IN1, a second input terminal IN2, a first voltage input terminal V1, a second voltage input terminal V2, a third voltage input terminal V3, a first clock terminal BCLK, a second clock terminal CCLK, a third clock terminal SCLK, a first control signal terminal SN1, a second control signal terminal SN2, a third control signal terminal SN3, a first output terminal OUT1, and a second output terminal OUT2.

The first output terminal OUT1 may be provided in a plurality to output a plurality of gate signals. For example, each stage may include eight first output terminals OUT11 to OUT18 to output eight gate signals. The third clock terminal SCLK may be provided in a plurality to correspond to the plurality of first output terminals OUT1. For example, the third clock terminal SCLK of each stage may include eight third clock terminals SCLK1 to SCLK8.

Each of the plurality of stages ST1 to STn may generate a carry signal (e.g., a second output signal), and may supply the carry signal (e.g., the second output signal) to the first input terminal IN1 of a next stage and the second input terminal IN2 of a previous stage.

A start signal STV or a carry signal output by a previous stage (hereinafter, referred to as a "previous carry signal") may be input to the first input terminal IN1. For example, the start signal STV may be input to the first input terminal IN1 of the first stage ST1, and a corresponding previous carry signal may be input to the first input terminal IN1 of each of the second to $n^{th}$ stages ST2 to STn as a start signal. The previous stage may include at least one previous stage. FIGS. 7 and 8 show embodiments in which the previous stage corresponds to a directly previous stage. For example, as illustrated in FIG. 8, a $k-1^{th}$ carry signal CR[k−1] output from the $k-1^{th}$ stage may be input to the first input terminal IN1 of the $k^{th}$ stage STK as a start signal.

A carry signal output by a next stage (hereinafter, referred to as a "next carry signal") may be input to the second input terminal IN2. The next stage may include at least one next stage. FIGS. 7 and 8 show embodiments in which the next stage corresponds to a directly next stage. For example, as illustrated in FIG. 8, a carry signal CR[k+1] output from the $k+1^{th}$ stage may be input to the second input terminal IN2 of the $k^{th}$ stage STK.

A first voltage VGH may be input to the first voltage input terminal V1, a second voltage VGL1 may be input to the second voltage input terminal V2, and a third voltage VGL2 may be input to the third voltage input terminal V3. The second voltage VGL1 may have a lower voltage level than that of the first voltage VGH. The third voltage VGL2 may have a lower voltage level than that of the second voltage VGL1. The first voltage VGH, the second voltage VGL1, and the third voltage VGL2 may be global signals, and may be input from the controller 190 illustrated in FIG. 1, a power supply circuit, and/or the like.

A boosting clock signal BCK may be input to the first clock terminal BCLK. As illustrated in FIG. 9, the boosting clock signal BCK may include a first boosting clock signal BCK1 and a second boosting clock signal BCK2. The first boosting clock signal BCK1 or the second boosting clock signal BCK2 may be input to the first clock terminal BCLK. The first boosting clock signal BCK1 and the second boosting clock signal BCK2 may be alternately input to the first clock terminals BCLK of the stages ST1 to STn. For example, the first boosting clock signal BCK1 may be input to the first clock terminals BCLK of the odd-numbered stages ST1, ST3, . . . , and the like, and the second boosting clock signal BCK2 may be input to the first clock terminals BCLK of the even-numbered stages ST2, ST4, . . . , and the like.

The first boosting clock signal BCK1 and the second boosting clock signal BCK2 may be square wave signals repeating a high-level voltage and a low-level voltage. The high-level voltage may be a gate-on voltage for turning on an N-type transistor, and the low-level voltage may be a gate-off voltage for turning off the N-type transistor. The first boosting clock signal BCK1 and the second boosting clock signal BCK2 may be signals having the same or substantially the same waveform as each other and shifted phases from each other. For example, the second boosting clock signal BCK2 may have the same or substantially the same waveform as that of the first boosting clock signal BCK1, and may be input by being phase-shifted (e.g., phase-delayed) by a suitable interval (e.g., a predetermined interval). The second boosting clock signal BCK2 may be half-cycle shifted compared to the first boosting clock signal BCK1. The first boosting clock signal BCK1 and the second boosting clock signal BCK2 may have a gate-on voltage period that is longer than a gate-off voltage period in one cycle. However, the present disclosure is not limited thereto, and the first boosting clock signal BCK1 and the second boosting clock signal BCK2 may have a gate-on voltage period that is the same or substantially the same as or shorter than a gate-off voltage period in one cycle. The gate-on voltage of the first boosting clock signal BCK1 and the second boosting clock signal BCK2 may be 12V, and the gate-off voltage of the first boosting clock signal BCK1 and the second boosting clock signal BCK2 may be −9V. However, the gate-on voltage and the gate-off voltage of the first boosting clock signal BCK1 and the second boosting clock signal BCK2 are not limited thereto.

During the display period DP (e.g. refer to FIG. 3), the first boosting clock signal BCK1 and the second boosting clock signal BCK2 may alternately have the gate-on voltage and the gate-off voltage, and during a portion of the vertical blank period VBP (e.g. refer to FIG. 3), for example, such as during the sensing period SP, the first boosting clock signal BCK1 and the second boosting clock signal BCK2 may have the gate-on voltage.

A carry clock signal CR_CK may be input to the second clock terminal CCLK. As illustrated in FIG. 9, the carry clock signal CR_CK may include a first carry clock signal CR_CK1 and a second carry clock signal CR_CK2. The first carry clock signal CR_CK1 or the second carry clock signal CR_CK2 may be input to the second clock terminal CCLK. The first carry clock signal CR_CK1 and the second carry clock signal CR_CK2 may be alternately input to the second clock terminals CCLK of the stages ST1 to STn. For example, the first carry clock signal CR_CK1 may be input to the second clock terminals CCLK of the odd-numbered stages ST1, ST3, . . . , and the like, and the second carry clock signal CR_CK2 may be input to the second clock terminals CCLK of the even-numbered stages ST2, ST4, . . . , and the like.

The first carry clock signal CR_CK1 and the second carry clock signal CR_CK2 may be square wave signals repeating a high-level voltage and a low-level voltage. The first carry clock signal CR_CK1 and the second carry clock signal CR_CK2 may be signals having the same or substantially the same waveform as each other and shifted phases from each other. For example, the second carry clock signal CR_CK2 may have the same or substantially the same waveform as that of the first carry clock signal CR_CK1, and may be input by being phase-shifted (e.g., phase-delayed) by a suitable interval (e.g., a predetermined interval). The second carry clock signal CR_CK2 may be half-cycle shifted compared to the first carry clock signal CR_CK1. The first carry clock signal CR_CK1 and the second carry clock signal CR_CK2 may have a gate-on voltage period that is shorter than a gate-off voltage period in one cycle. However, the present disclosure is not limited thereto, and the first carry clock signal CR_CK1 and the second carry clock signal CR_CK2 may have a gate-on voltage period that is the same or substantially the same as or longer than a gate-off voltage period in one cycle. The gate-on voltage of the first carry clock signal CR_CK1 and the second carry clock signal CR_CK2 may be 12V, and the gate-off voltage of the first carry clock signal CR_CK1 and the second carry clock signal CR_CK2 may be −9V. However, the gate-on voltage and the gate-off voltage of the first carry clock signal CR_CK1 and the second carry clock signal CR_CK2 are not limited thereto.

During the display period DP, the first carry clock signal CR_CK1 and the second carry clock signal CR_CK2 may alternately have the gate-on voltage and the gate-off voltage, and during the vertical blank period VBP, the first carry clock signal CR_CK1 and the second carry clock signal CR_CK2 may have the gate-off voltage.

The gate-on voltage period of the first boosting clock signal BCK1 may overlap with the gate-on voltage period of the first carry clock signal CR_CK1. The gate-on voltage period of the second boosting clock signal BCK2 may overlap with the gate-on voltage period of the second carry clock signal CR_CK2. The gate-on voltage period of the carry clock signal CR_CK may be shorter than the gate-on voltage period of the boosting clock signal BCK.

Each of the plurality of stages ST1 to STn may include the plurality of third clock terminals SCLK. One of a plurality of scan clock signals SC_CK may be input to a corresponding one of the plurality of third clock terminals SCLK. Each of the plurality of stages ST1 to STn may include i third clock terminals SCLK, and may receive i scan clock signals SC_CK of 2i scan clock signals SC_CK. Here, i may be an integer that is equal to or greater than 2.

According to an embodiment, each stage may include eight third clock terminals SCLK1 to SCLK8, and one of eight scan clock signals from among a total of sixteen scan clock signals, or in other words, first to sixteenth scan clock signals SC_CK1 to SC_CK16, may be input to a corresponding one of the third clock terminals SCLK1 to SCLK8. For example, the first to eighth scan clock signals SC_CK1 to SC_CK8 may be sequentially input to the third clock terminals SCLK1 to SCLK8 of the odd-numbered stages ST1, ST3, . . . , and the like, and the ninth to sixteenth scan clock signals SC_CK9 to SC_CK16 may be sequentially input to the third clock terminals SCLK1 to SCLK8 of the even-numbered stages ST2, ST4, . . . , and the like.

The total of sixteen scan clock signals, or in other words, the first to sixteenth scan clock signals SC_CK1 to SC_CK16, may be square wave signals repeatedly having a high-level voltage and a low-level voltage. The first to sixteenth scan clock signals SC_CK1 to SC_CK16 may be signals having the same or substantially the same waveform as each other and shifted phases from one another. The first to sixteenth scan clock signals SC_CK1 to SC_CK16 may be supplied to the gate driving circuit 130 by being sequentially phase-shifted, such that gate-on voltage periods thereof may partially overlap with each other. The first to sixteenth scan clock signals SC_CK1 to SC_CK16 may have the gate-on voltage period that is set to be shorter than a gate-off voltage period in one cycle. However, the present disclosure is not limited thereto, and the first to sixteenth scan clock signals SC_CK1 to SC_CK16 may have the gate-on voltage period that is set to be the same or substantially the same as or longer than a gate-off voltage period in one cycle. The gate-on voltage of the first to sixteenth scan clock signals SC_CK1 to SC_CK16 may be 12V, and the gate-off voltage of the first to sixteenth scan clock signals SC_CK1 to SC_CK16 may be −5V. However, the gate-on voltage and the gate-off voltage of the first to sixteenth scan clock signals SC_CK1 to SC_CK16 are not limited thereto.

During the display period DP, the first to sixteenth scan clock signals SC_CK1 to SC_CK16 may alternately have the gate-on voltage and the gate-off voltage, and during the sensing period SP of the vertical blank period VBP, the first to sixteenth scan clock signals SC_CK1 to SC_CK16 may have the gate-on voltage.

The gate-on voltage period of the boosting clock signal BCK may overlap with the gate-on voltage periods of the sixteen scan clock signals. As illustrated in FIG. 9, the first to eighth scan clock signals SC_CK1 to SC_CK8 may sequentially have the gate-on voltage during the gate-on voltage period of the first boosting clock signal BCK1. The ninth to sixteenth scan clock signals SC_CK9 to SC_CK16 may sequentially have the gate-on voltage during the gate-on voltage period of the second boosting clock signal BCK2. Thus, the plurality of gate signals may be stably output in correspondence with the plurality of scan clock signals in one stage.

A first control signal S1 may be input to the first control signal terminal SN1. The first control signal S1 may be selectively supplied, as the gate-on voltage, to at least one stage corresponding to the rows on which sensing is to be performed in a corresponding frame, so that a sensing node M (e.g., see FIG. 10) in the stage may be charged.

A second control signal S2 may be input to the second control signal terminal SN2. The second control signal S2 of the gate-on voltage may be supplied, so that a voltage of the sensing node M charged by the first control signal S1 may be supplied to the first control node Q (e.g., see FIG. 10) in the stage.

A third control signal S3 may be input to the third control signal terminal SN3. The third control signal S3 may be supplied when an operation error of a display apparatus occurs, and/or in order to initialize (e.g., reset) a voltage of the first control node Q and the second control node QB before and/or after the sensing period SP of the vertical blank period VBP. The third control signal S3 of the gate-on voltage may be supplied during a suitable time period (e.g., a predetermined time period), so that the first control node Q (e.g., see FIG. 10) in the stage may be set as the second level voltage and the second control node QB (e.g., see FIG. 10) may be set as the first level voltage.

The gate signal GS (e.g., see FIG. 10) may be output from the first output terminal OUT1. Each of the plurality of stages ST1 to STn may include the plurality of first output terminals OUT1, and may output the plurality of gate signals by sequentially shifting the plurality of gate signals by a suitable period (e.g., a predetermined period). Each gate signal may be supplied to the pixel through a corresponding gate line corresponding to the pixel.

The number of first output terminals OUT1 may be the same as the number of scan clock signals SC_CK that are input to the stage. For example, eight scan clock signals SC_CK may be input to each of the plurality of stages ST1 to STn, and each stage may include eight first output terminals, for example, such as $1^{st}$-1 to $1^{st}$-8 output terminals OUT11, OUT12, . . . , and OUT18. As illustrated in FIG. 8, a $p^{th}$ gate signal GS[p] from the $1^{st}$-1 output terminal OUT11 of the $k^{th}$ stage STK may be output to a $p^{th}$ gate line, a $p+1^{th}$ gate signal GS[p+1] from the $1^{st}$2 output terminal OUT12 may be output to a $p+1^{th}$ gate line, and a $p+7^{th}$ gate signal GS[p+7] from the $1^{st}$-8 output terminal OUT18 may be output to a $p+7^{th}$ gate line. Here, p may be a positive integer, so that p+7 may be 8 k.

The carry signal may be output from the second output terminal OUT2. The carry signals CR[1], CR[2], CR[3], . . . , CR[n] output from the second output terminals OUT2 of the stages ST1 to STn may be sequentially shifted by a suitable period (e.g., a predetermined period). The carry signal may be supplied to the first input terminal IN1 of the next stage and the second input terminal IN2 of the previous stage.

In some embodiments, the gate driving circuit 130 may further include at least one previous dummy stage at a previous-end of the first stage ST1, and may further include at least one next dummy stage at a next-end of the $n^{th}$ stage STn.

The previous dummy stage may generate the carry signal in response to the start signal STV, and output the carry signal to the next stage. For example, the gate driving circuit 130 may include one previous dummy stage, and the previous dummy stage may generate the carry signal in response to the start signal STV to supply the generated carry signal to the first input terminal IN1 of the first stage ST1.

The next dummy stage may receive the carry signal output by the previous stage as a start signal, and may generate the carry signal to output the generated carry signal to the previous stage. For example, the gate driving circuit 130 may include one next dummy stage, and the next dummy stage may generate the carry signal in response to the carry signal input from the previous stage (for example, the $n^{th}$ stage STn) to provide the generated carry signal to the second input terminal IN2 of the $n^{th}$ stage STn.

Figure 10:
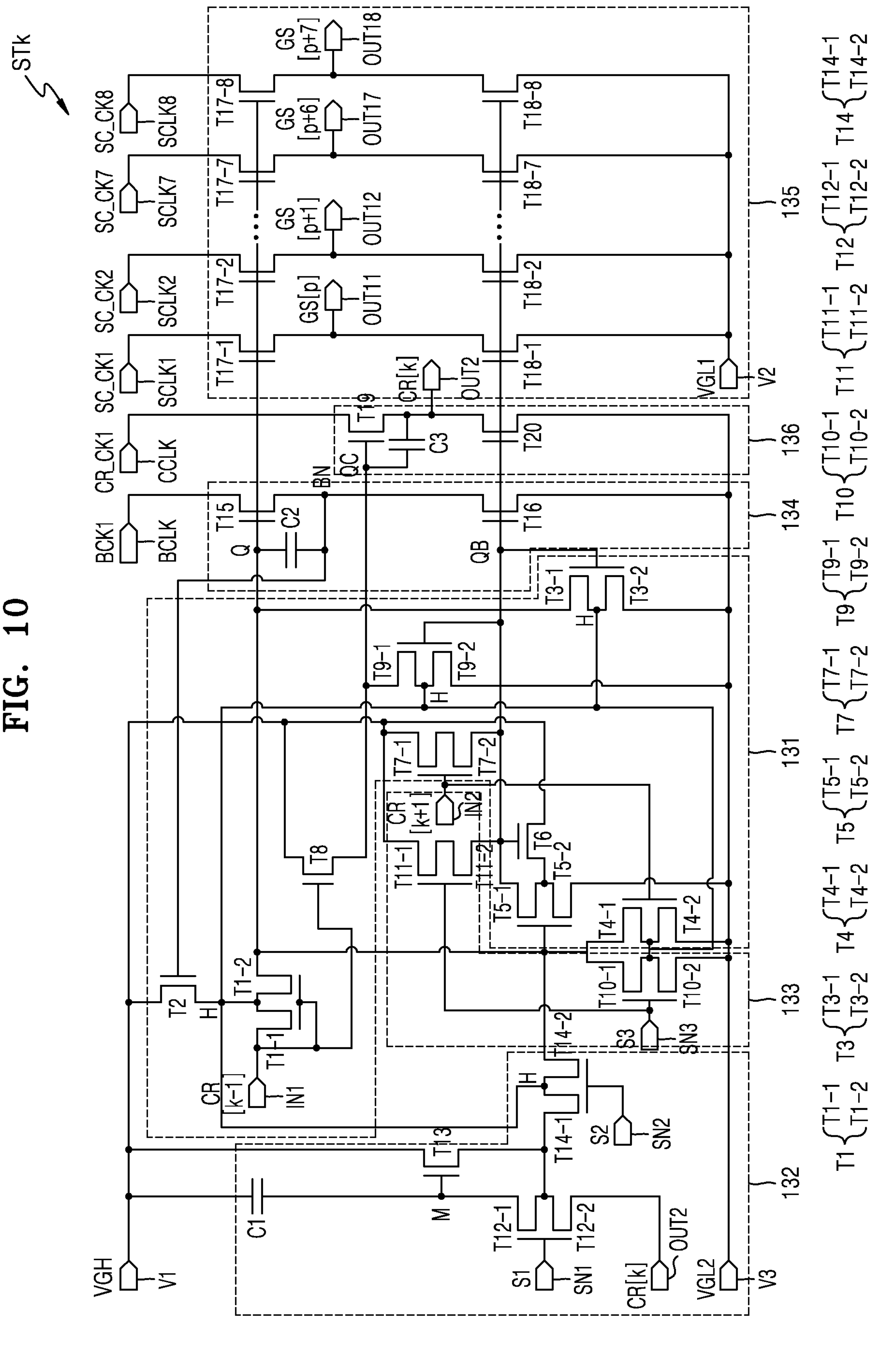
FIG. 10 is a circuit diagram of a stage included in a gate driving circuit according to an embodiment.
Figure 11:
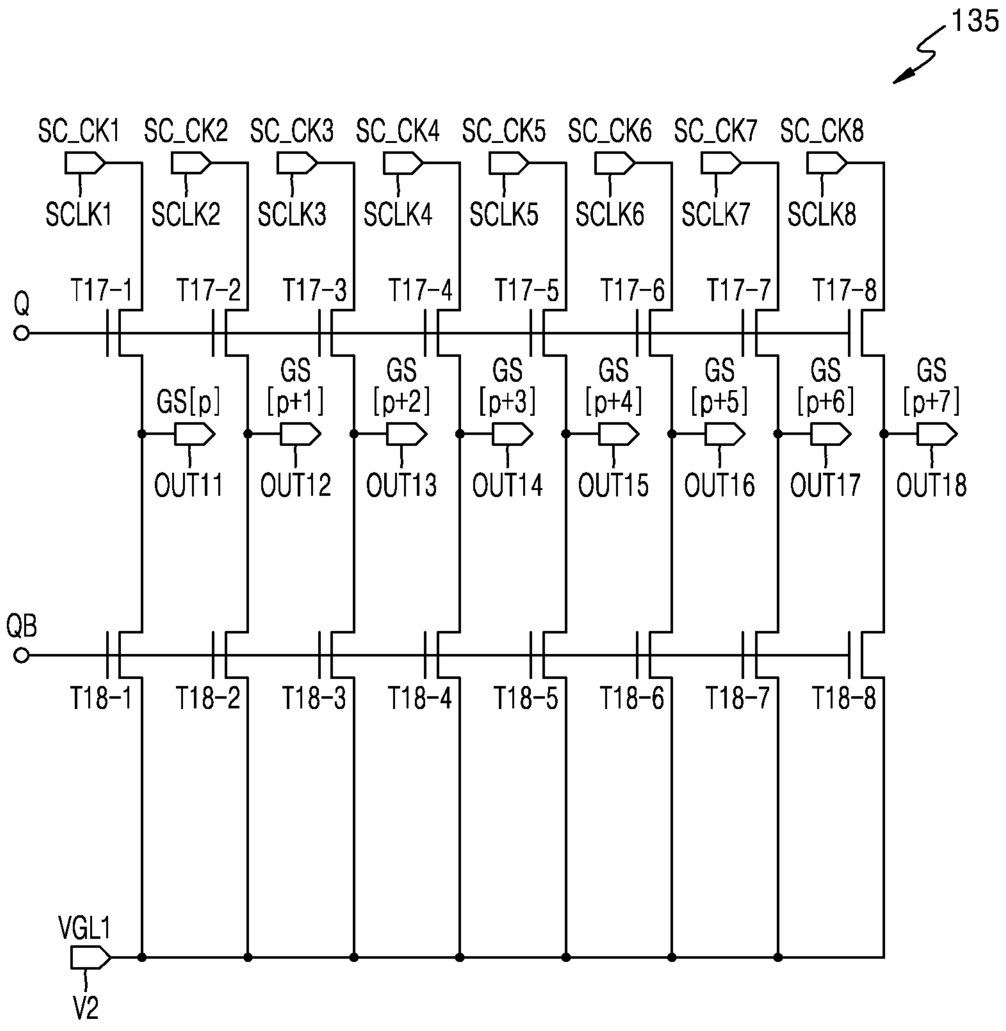
FIG. 11 is a circuit diagram of a portion of the stage illustrated in FIG. 10.

FIG. 10 is a circuit diagram of a stage included in a gate driving circuit according to an embodiment. FIG. 11 is a circuit diagram of a portion of the stage illustrated in FIG. 10.

Each of the stages ST1 to STn (e.g., see FIG. 7) may have a plurality of nodes. Hereinafter, some of the plurality of nodes are referred to as the sensing node M, the first control node Q, the second control node QB, and a third control node QC. According to an embodiment, a plurality of transistors included in a circuit of each of the first to $n^{th}$ stages ST1 to STn may be the same type as those of the transistors included in the pixel circuit illustrated in FIG. 2. For example, the plurality of transistors included in the circuit of each of the first to $n^{th}$ stages ST1 to STn may include N-type oxide thin-film transistors including a semiconductor layer including an amorphous or crystalline oxide semiconductor. The oxide semiconductor may include an IGZO semiconductor or an ITGZO semiconductor.

In the odd-numbered stages, the first boosting clock signal BCK1 may be supplied to the first clock terminal BCLK, the first carry clock signal CR_CK1 may be supplied to the second clock terminal CCLK, and the first to eighth scan clock signals SC_CK1 to SC_CK8 may be supplied to the third clock terminals SCLK1 to SCLK8. In the even-numbered stages, the second boosting clock signal BCK2 (e.g., see FIG. 7) may be supplied to the first clock terminal BCLK, the second carry clock signal CR_CK2 (e.g., see FIG. 7) may be supplied to the second clock terminal CCLK, and the ninth to sixteenth scan clock signals SC_CK9 to SC_CK16 (e.g., see FIG. 9) may be supplied to the third clock terminals SCLK1 to SCLK8.

Hereinafter, the $k^{th}$ stage STK corresponding to the $k^{th}$ row of the pixel portion 110 (e.g., see FIG. 1) is described in more detail as a representative example. The $k^{th}$ stage STK may receive, as a start signal, the $k-1^{th}$ carry signal CR[k−1] from the $k-1^{th}$ stage, which is the previous stage, and may output $p^{th}$ to $p+7^{th}$ gate signals GS[p], GS[p+1], GS[p+2], . . . , and GS[p+7] to the gate lines of the $p^{th}$ to $p+7^{th}$ rows. For convenience, an example where the $k^{th}$ stage STK may be an odd-numbered stage, the first boosting clock signal BCK1 may be supplied to the first clock terminal BCLK, the first carry clock signal CR_CK1 may be supplied to the second clock terminal CCLK, and the first to eighth scan clock signals SC_CK1 to SC_CK8 may be supplied to the third clock terminals SCLK1 to SCLK8 is described in more detail hereinafter. When k is 1, the first stage ST1 may receive the start signal STV through the first input terminal IN.

As used hereinafter, to supply an arbitrary signal may denote that a gate-on voltage (for example, a first level voltage that is a high-level voltage) is supplied, and not to supply an arbitrary signal may denote that a gate-off voltage (for example, a second level voltage that is a low-level voltage) is supplied. A first voltage VGH may be the first level voltage, and a second voltage VGL1 and a third voltage VGL2 may be the second level voltage.

Referring to FIG. 10, the $k^{th}$ stage STK may include a first control circuit 131, a second control circuit 132, an initialization circuit 133, a boosting circuit 134, a first output circuit 135, and a second output circuit 136.

The first control circuit 131 may control voltages of the first control node Q, the second control node QB, and the third control node QC in response to signals that are input to the first input terminal IN1 and the second input terminal IN2. For example, the first control circuit 131 may control the voltages of the first control node Q, the second control node QB, and the third control node QC in response to a previous carry signal CR[k−1] and a next carry signal CR[k+1]. The first control circuit 131 may include first to ninth transistors T1 to T9. The first control circuit 131 may include a first circuit configured to control the voltage of the first control node Q, a second circuit configured to control the voltage of the second control node QB, and a third circuit configured to control the voltage of the third control node QC.

The first circuit may include the first transistor T1, the second transistor T2, the third transistor T3, and the fourth transistor T4.

The first transistor T1 may be connected between the first input terminal IN1 and the first control node Q. The first transistor T1 may include a plurality of sub-transistors that are connected in series. The sub-transistors may include a pair of $1^{st}$-1 transistor T1-1 and $1^{st}$-2 transistor T1-2. Gates of the $1^{st}$-1 transistor T1-1 and the $1^{st}$-2 transistor T1-2 may be connected to the first input terminal IN1. The $1^{st}$-1 transistor T1-1 and the $1^{st}$-2 transistor T1-2 may be turned on when the previous carry signal CR[k−1] is supplied, and may set the voltage of the first control node Q as a voltage of the previous carry signal CR[k−1].

The second transistor T2 may be connected between the first voltage input terminal V1 and a first node H. A gate of the second transistor T2 may be connected to a second node BN. An intermediate node (e.g., a common electrode) between the $1^{st}$-1 transistor T1-1 and the $1^{st}$-2 transistor T1-2 may be connected to the first node H. The second transistor T2 may be turned on when the second node BN is the first level voltage, and may set the intermediate node between the $1^{st}$-1 transistor T1-1 and the $1^{st}$-2 transistor T1-2 as the first voltage VGH. Accordingly, it may be possible to prevent or substantially prevent a voltage drop of the first control node Q due to a leakage current of the first transistor T1 when the first transistor T1 is turned off.

The third transistor T3 may be connected between the first control node Q and the third voltage input terminal V3. The third transistor T3 may include a plurality of sub-transistors that are serially connected. The sub-transistors may include a pair of $3^{rd}$-1 transistor T3-1 and $3^{rd}$-2 transistor T3-2. Gates of the $3^{rd}$-1 transistor T3-1 and the $3^{rd}$-2 transistor T3-2 may be connected to the second control node QB. An intermediate node (e.g., a common electrode) between the $3^{rd}$-1 transistor T3-1 and the $3^{rd}$-2 transistor T3-2 may be connected to the first node H, and may be set as the first voltage VGH transmitted through the second transistor T2. The $3^{rd}$-1 transistor T3-1 and the $3^{rd}$-2 transistor T3-2 may be turned on when the second control node QB is the first level voltage, and may set the first control node Q as the third voltage VGL2.

The fourth transistor T4 may be connected between the first control node Q and the third voltage input terminal V3. The fourth transistor T4 may include a plurality of sub-transistors that are serially connected. The sub-transistors may include a pair of $4^{th}$-1 transistor T4-1 and $4^{th}$-2 transistor T4-2. Gates of the $4^{th}$-1 transistor T4-1 and the $4^{th}$-2 transistor T4-2 may be connected to the second input terminal IN2. An intermediate node (e.g., a common electrode) between the $4^{th}$-1 transistor T4-1 and the $4^{th}$-2 transistor T4-2 may be connected to the first node H, and may be set as the first voltage VGH transmitted through the second transistor T2. The $4^{th}$-1 transistor T4-1 and the $4^{th}$-2 transistor T4-2 may be turned on when the next carry signal CR[k+1] is supplied, and may set the voltage of the first control node Q as the third voltage VGL2.

The second circuit may include the fifth transistor T5, the sixth transistor T6, and the seventh transistor T7.

The fifth transistor T5 may be connected between the second control node QB and the third voltage input terminal V3. The fifth transistor T5 may include a plurality of sub-transistors that are serially connected. The sub-transistors may include a pair of $5^{th}$-1 transistor T5-1 and $5^{th}$-2 transistor T5-2. Gates of the $5^{th}$-1 transistor T5-1 and the $5^{th}$-2 transistor T5-2 may be connected to the first control node Q. The $5^{th}$-1 transistor T5-1 and the $5^{th}$-2 transistor T5-2 may be turned on when the first control node Q is the first level voltage, and may set the voltage of the second control node QB as the third voltage VGL2.

The sixth transistor T6 may be connected between the first voltage input terminal V1 and an intermediate node (e.g., a common electrode) between the $5^{th}$-1 transistor T5-1 and the $5^{th}$-2 transistor T5-2. A gate of the sixth transistor T6 may be connected to the second control node QB. The sixth transistor T6 may be turned on when the second control node QB is the first level voltage, and may set the intermediate node between the $5^{th}$-1 transistor T5-1 and the $5^{th}$-2 transistor T5-2 as the first voltage VGH.

The seventh transistor T7 may be connected between the first voltage input terminal V1 and the second control node QB. The seventh transistor T7 may include a plurality of sub-transistors that are serially connected. The sub-transistors may include a pair of $7^{th}$-1 transistor T7-1 and $7^{th}$-2 transistor T7-2. Gates of the $7^{th}$-1 transistor T7-1 and the $7^{th}$-2 transistor T7-2 may be connected to the second input terminal IN2. The $7^{th}$-1 transistor T7-1 and the $7^{th}$-2 transistor T7-2 may be turned on when the next carry signal CR[k+1] is supplied, and may set the voltage of the second control node QB as the first voltage VGH.

The third circuit may include the eighth transistor T8 and the ninth transistor T9.

The eighth transistor T8 may be connected between the first voltage input terminal V1 and the third control node QC. A gate of the eighth transistor T8 may be connected to the first input terminal IN1. The eighth transistor T8 may be turned on when the previous carry signal CR[k−1] is supplied, and may set the voltage of the third control node QC as the first voltage VGH.

The ninth transistor T9 may be connected between the third control node QC and the third voltage input terminal V3. The ninth transistors T9 may include a plurality of sub-transistors that are serially connected. The sub-transistors may include a pair of $9^{th}$-1 transistor T9-1 and $9^{th}$-2 transistor T9-2. Gates of the $9^{th}$-1 transistor T9-1 and the $9^{th}$-2 transistor T9-2 may be connected to the second control node QB. An intermediate node (e.g., a common electrode) between the $9^{th}$-1 transistor T9-1 and the $9^{th}$-2 transistor T9-2 may be connected to the first node H, and may be set as the first voltage VGH transmitted through the second transistor T2. The $9^{th}$-1 transistor T9-1 and the $9^{th}$-2 transistor T9-2 may be turned on when the second control node QB is the first level voltage, and may set the voltage of the third control node QC as the third voltage VGL2.

The second control circuit 132 may supply the first voltage VGH to the first control node Q and the third voltage VGL2 to the second control node QB for sensing state information of the pixel PX (e.g., see FIG. 1).

The second control circuit 132 may control the voltages of the first control node Q and the second control node QB in response to signals that are input to the first control signal terminal SN1 and the second control signal terminal SN2. For example, the second control circuit 132 may control the voltages of the first control node Q and the second control node QB in response to the first control signal S1 and the second control signal S2. The second control circuit 132 may include twelfth to fourteenth transistors T12 to T14 and a first capacitor C1.

The first control signal S1 may be supplied at an arbitrary timing during the display period DP (e.g., see FIG. 3). For example, the first control signal S1 may be supplied at an output timing of the $k^{th}$ carry signal CR[k]. The $k^{th}$ carry signal CR[k] may be supplied during the display period DP to charge the sensing node M for pixel sensing. The second control signal S2 may be supplied during the sensing period SP (e.g., see FIG. 3) of the vertical blank period VBP (e.g., see FIG. 3) to supply the first voltage VGH to the first control node Q for pixel sensing.

The twelfth transistor T12 may be connected between the sensing node M and the second output terminal OUT2. The twelfth transistor T12 may be turned on by the first control signal S1 synchronized to the $k^{th}$ carry signal CR[k] that is output by the second output circuit 136. The twelfth transistor T12 may include a plurality of sub-transistors that are serially connected. The sub-transistors may include a pair of $12^{th}$-1 transistor T12-1 and $12^{th}$-2 transistor T12-2. Gates of the $12^{th}$-1 transistor T12-1 and the $12^{th}$-2 transistor T12-2 may be connected to the first control signal terminal SN1. The $12^{th}$-1 transistor T12-1 and the $12^{th}$-2 transistor T12-2 may be turned on when the first control signal S1 is supplied, and may set a voltage of the sensing node M as a voltage of the $k^{th}$ carry signal CR[k].

The thirteenth transistor T13 may be connected between the first voltage input terminal V1 and an intermediate node (e.g., a common electrode) between the $12^{th}$-1 transistor T12-1 and the $12^{th}$-2 transistor T12-2. A gate of the thirteenth transistor T13 may be connected to the sensing node M. The thirteenth transistor T13 may be turned on when the sensing node M is the first level voltage, and may set the intermediate node between the $12^{th}$-1 transistor T12-1 and the $12^{th}$-2 transistor T12-2 as the first voltage VGH.

The fourteenth transistor T14 may be connected between the intermediate node between the $12^{th}$-1 transistor T12-1 and the $12^{th}$-2 transistor and the first control node Q. The fourteenth transistor T14 may be connected between the thirteenth transistor T13 and the first control node Q. The fourteenth transistor T14 may include a plurality of sub-transistors that are serially connected. The sub-transistors may include a pair of $14^{th}$-1 transistor T14-1 and $14^{th}$-2 transistor T14-2. Gates of the $14^{th}$-1 transistor T14-1 and the $14^{th}$-2 transistor T14-2 may be connected to the second control signal terminal SN2. The $14^{th}$-1 transistor T14-1 and the $14^{th}$-2 transistor T14-2 may be turned on when the second control signal S2 is supplied, and may electrically connect the thirteenth transistor T13 with the first control node Q. An intermediate node (e.g., a common electrode) between the $14^{th}$-1 transistor T14-1 and the $14^{th}$-2 transistor T14-2 may be connected to the first node H, and may be set as the first voltage VGH transmitted through the second transistor T2. Accordingly, it may be possible to prevent or substantially prevent a voltage drop of the first control node Q due to a leakage current of the fourteenth transistor T14 when the fourteenth transistor T14 is turned off.

The first capacitor C1 may be connected between the first voltage input terminal V1 and the sensing node M. When the sensing node M is set as the first level voltage of the $k^{th}$ carry signal CR[k], the first capacitor C1 may store a difference between the first voltage VGH and a voltage of the gate of the thirteenth transistor T13.

The initialization circuit 133 may initialize the voltages of the first control node Q and the second control node QB in response to a signal input to the third control signal terminal SN3. For example, the initialization circuit 133 may control the voltages of the first control node Q and the second control node QB in response to the third control signal S3. The initialization circuit 133 may include a tenth transistor T10 and an eleventh transistor T11.

The tenth transistor T10 may be connected between the first control node Q and the third voltage input terminal V3. The tenth transistor T10 may include a plurality of sub-transistors that are serially connected. The sub-transistors may include a pair of $10^{th}$-1 transistor T10-1 and $10^{th}$-2 transistor T10-2. Gates of the $10^{th}$-1 transistor T10-1 and the $10^{th}$-2 transistor T10-2 may be connected to the third control signal terminal SN3. An intermediate node (e.g., a common electrode) between the $10^{th}$-1 transistor T10-1 and the $10^{th}$-2 transistor T10-2 may be connected to the first node H, and may be set as the first voltage VGH transmitted through the second transistor T2. The $10^{th}$-1 transistor T10-1 and the $10^{th}$-2 transistor T10-2 may be turned on when the third control signal S3 is supplied, and may set the voltage of the first control node Q as the third voltage VGL2.

The eleventh transistor T11 may be connected between the first voltage input terminal V1 and the second control node QB. The eleventh transistor T11 may include a plurality of sub-transistors that are serially connected. The sub-transistors may include a pair of $11^{th}$-1 transistors T11-1 and $11^{th}$-2 transistor T11-2. Gates of the $11^{th}$-1 transistor T11-1 and the $11^{th}$-2 transistor T11-2 may be connected to the third control signal terminal SN3. The $11^{th}$-1 transistor T11-1 and the $11^{th}$-2 transistor T11-2 may be turned on when the third control signal S3 is supplied, and may set the voltage of the second control node QB as the first voltage VGH.

The boosting circuit 134 may boost the voltage of the first control node Q in response to a signal that is input to the first clock terminal BCLK. For example, the boosting circuit 134 may boost the voltage of the first control node Q in response to the first boosting clock signal BCK1. The boosting circuit 134 may include a fifteenth transistor T15, a sixteenth transistor T16, and a second capacitor C2.

The fifteenth transistor T15 may be connected between the first clock terminal BCLK and the second node BN. A gate of the fifteenth transistor T15 may be connected to the first control node Q. The fifteenth transistor T15 may be turned on or turned off according to the voltage of the first control node Q. The fifteenth transistor T15 may be turned on when the first control node Q is set as the first level voltage, and may transmit a first level voltage of the first boosting clock signal BCK1 to the second node BN.

The sixteenth transistor T16 may be connected between the second node BN and the third voltage input terminal V3. A gate of the sixteenth transistor T16 may be connected to the second control node QB. The sixteenth transistor T16 may be turned on or turned off according to the voltage of the second control node QB. The sixteenth transistor T16 may be turned on when the second control node QB is set as the first level voltage, and may transmit the third voltage VGL2 to the second node BN.

The second capacitor C2 may be connected between the first control node Q and the second node BN. The voltage of the first control node Q may be changed by the second capacitor C2 according to a change of a voltage of the second node BN. When the fifteenth transistor T15 is turned on when the first control node Q is the first level voltage and the first boosting clock signal BCK1 of the first level voltage is output to the second node BN, the voltage of the first control node Q may be boosted by the second capacitor C2. Because the voltage of the first control node Q is boosted while the plurality of gate signals are being output, stable multi-outputting operations of the gate signals may be possible.

The first output circuit 135 may output the scan clock signal SC_CK (e.g. refer to FIG. 9) or the second voltage VGL1 to the first output terminal OUT1 (e.g. refer to FIG. 8) according to the voltages of the first control node Q and the second control node QB. The first output circuit 135 may include a plurality of sub-output circuits, and one of a plurality of scan clock signals may be input to a third clock terminal of each of the plurality of sub-output circuits. The plurality of scan clock signals may have the same or substantially the same waveforms as each other and phases shifted by a suitable interval (e.g., a predetermined interval) from each other. According to an embodiment, as illustrated in FIG. 11, the first output circuit 135 may include a plurality of first to eighth sub-output circuits. Each of the first to eighth sub-output circuits may include a seventeenth transistor and an eighteenth transistor. The seventeenth transistor may be a pull-up transistor configured to transmit a first level voltage to an output terminal. The eighteenth transistor may be a pull-down transistor configured to transmit a second level voltage to the output terminal.

The first sub-output circuit may include a $17^{th}$-1 transistor T17-1 and an $18^{th}$-1 transistor T18-1. The $17^{th}$-1 transistor T17-1 may be connected between the $3^{rd}$-1 clock terminal SCLK1 and the $1^{st}$-1 output terminal OUT11. A gate of the $17^{th}$-1 transistor T17-1 may be connected to the first control node Q. The $17^{th}$-1 transistor T17-1 may be turned on or turned off according to the voltage of the first control node Q. The $17^{th}$-1 transistor T17-1 may be turned on when the first control node Q is set as the first level voltage, and may output the first scan clock signal SC_CK1 of the first level voltage as the $p^{th}$ gate signal GS[p] of the first level voltage, or may output the first scan clock signal SC_CK1 of the second level voltage as the $p^{th}$ gate signal GS[p] of the second level voltage. The $18^{th}$-1 transistor T18-1 may be connected between the $1^{st}$-1 output terminal OUT11 and the second voltage input terminal V2. A gate of the $18^{th}$-1 transistor T18-1 may be connected to the second control node QB. The $18^{th}$-1 transistor T18-1 may be turned on or turned off according to the voltage of the second control node QB. The $18^{th}$-1 transistor T18-1 may be turned on when the second control node QB is set as the first level voltage, and may output the second voltage VGL1 as the $p^{th}$ gate signal GS[p] of the second level voltage.

The second sub-output circuit may include a $17^{th}$-2 transistor T17-2 and an $18^{th}$-2 transistor T18-2. The $17^{th}$-2 transistor T17-2 may be connected between the $3^{rd}$-2 clock terminal SCLK2 and the $1^{st}$-2 output terminal OUT12. A gate of the $17^{th}$-2 transistor T17-2 may be connected to the first control node Q. The $17^{th}$-2 transistor T17-2 may be turned on or turned off according to the voltage of the first control node Q. The $17^{th}$-2 transistor T17-2 may be turned on when the first control node Q is set as the first level voltage, and may output the second scan clock signal SC_CK2 of the first level voltage as the $p+1^{th}$ gate signal GS[p+1] of the first level voltage, or may output the second scan clock signal SC_CK2 of the second level voltage as the $p+1^{th}$ gate signal GS[p+1] of the second level voltage. The $18^{th}$-2 transistor T18-2 may be connected between the $1^{st}$-2 output terminal OUT12 and the second voltage input terminal V2. A gate of the $18^{th}$-2 transistor T18-2 may be connected to the second control node QB. The $18^{th}$-2 transistor T18-2 may be turned on or turned off according to the voltage of the second control node QB. The $18^{th}$-2 transistor T18-2 may be turned on when the second control node QB is set as the first level voltage, and may output the second voltage VGL1 as the $p+1^{th}$ gate signal GS[p+1] of the second level voltage.

The third sub-output circuit may include a $17^{th}$-3 transistor T17-3 and an $18^{th}$-3 transistor T18-3. The $17^{th}$-3 transistor T17-3 may be connected between the $3^{rd}$-3 clock terminal SCLK3 and the $1^{st}$-3 output terminal OUT13. A gate of the $17^{th}$-3 transistor T17-3 may be connected to the first control node Q. The $17^{th}$-3 transistor T17-3 may be turned on or turned off according to the voltage of the first control node Q. The $17^{th}$-3 transistor T17-3 may be turned on when the first control node Q is set as the first level voltage, and may output the third scan clock signal SC_CK3 of the first level voltage as the p+2$^{th}$ gate signal GS[p+2] of the first level voltage, or may output the third scan clock signal SC_CK3 of the second level voltage as the p+2$^{th}$ gate signal GS[p+2] of the second level voltage. The 18$^{th}$-3 transistor T18-3 may be connected between the 1$^{st}$-3 output terminal OUT13 and the second voltage input terminal V2. A gate of the 18$^{th}$-3 transistor T18-3 may be connected to the second control node QB. The 18$^{th}$-3 transistor T18-3 may be turned on or turned off according to the voltage of the second control node QB. The 18$^{th}$-3 transistor T18-3 may be turned on when the second control node QB is set as the first level voltage, and may output the second voltage VGL1 as the p+2$^{th}$ gate signal GS[p+2] of the second level voltage.

The fourth sub-output circuit may include a 17$^{th}$-4 transistor T17-4 and an 18$^{th}$-4 transistor T18-4. The 17$^{th}$-4 transistor T17-4 may be connected between the 3$^{rd}$-4 clock terminal SCLK4 and the 1$^{st}$-4 output terminal OUT14. A gate of the 17$^{th}$-4 transistor T17-4 may be connected to the first control node Q. The 17$^{th}$-4 transistor T17-4 may be turned on or turned off according to the voltage of the first control node Q. The 17$^{th}$-4 transistor T17-4 may be turned on when the first control node Q is set as the first level voltage, and may output the fourth scan clock signal SC_CK4 of the first level voltage as the p+3$^{th}$ gate signal GS[p+3] of the first level voltage, or may output the fourth scan clock signal SC_CK4 of the second level voltage as the p+3$^{th}$ gate signal GS[p+3] of the second level voltage. The 18$^{th}$-4 transistor T18-4 may be connected between the 1$^{st}$-4 output terminal OUT14 and the second voltage input terminal V2. A gate of the 18$^{th}$-4 transistor T18-4 may be connected to the second control node QB. The 18$^{th}$-4 transistor T18-4 may be turned on or turned off according to the voltage of the second control node QB. The 18$^{th}$-4 transistor T18-4 may be turned on when the second control node QB is set as the first level voltage, and may output the second voltage VGL1 as the p+3$^{th}$ gate signal GS[p+3] of the second level voltage.

The fifth sub-output circuit may include a 17$^{th}$-5 transistor T17-5 and an 18$^{th}$-5 transistor T18-5. The 17$^{th}$-5 transistor T17-5 may be connected between the 3$^{rd}$-5 clock terminal SCLK5 and the 1$^{st}$-5 output terminal OUT15. A gate of the 17$^{th}$-5 transistor T17-5 may be connected to the first control node Q. The 17$^{th}$-5 transistor T17-5 may be turned on or turned off according to the voltage of the first control node Q. The 17$^{th}$-5 transistor T17-5 may be turned on when the first control node Q is set as the first level voltage, and may output the fifth scan clock signal SC_CK5 of the first level voltage as the p+4$^{th}$ gate signal GS[p+4] of the first level voltage, or may output the fifth scan clock signal SC_CK5 of the second level voltage as the p+4$^{th}$ gate signal GS[p+4] of the second level voltage. The 18$^{th}$-5 transistor T18-5 may be connected between the 1$^{st}$-5 output terminal OUT15 and the second voltage input terminal V2. A gate of the 18$^{th}$-5 transistor T18-5 may be connected to the second control node QB. The 18$^{th}$-5 transistor T18-5 may be turned on or turned off according to the voltage of the second control node QB. The 18$^{th}$-5 transistor T18-5 may be turned on when the second control node QB is set as the first level voltage, and may output the second voltage VGL1 as the p+4$^{th}$ gate signal GS[p+4] of the second level voltage.

The sixth sub-output circuit may include a 17$^{th}$-6 transistor T17-6 and an 18$^{th}$-6 transistor T18-6. The 17$^{th}$-6 transistor T17-6 may be connected between the 3$^{rd}$-6 clock terminal SCLK6 and the 1$^{st}$-6 output terminal OUT16. A gate of the 17$^{th}$-6 transistor T17-6 may be connected to the first control node Q. The 17$^{th}$-6 transistor T17-6 may be turned on or turned off according to the voltage of the first control node Q. The 17$^{th}$-6 transistor T17-6 may be turned on when the first control node Q is set as the first level voltage, and may output the sixth scan clock signal SC_CK6 of the first level voltage as the p+5$^{th}$ gate signal GS[p+5] of the first level voltage, or may output the sixth scan clock signal SC_CK6 of the second level voltage as the p+5$^{th}$ gate signal GS[p+5] of the second level voltage. The 18$^{th}$-6 transistor T18-6 may be connected between the 1$^{st}$-6 output terminal OUT16 and the second voltage input terminal V2. A gate of the 18$^{th}$-6 transistor T18-6 may be connected to the second control node QB. The 18$^{th}$-6 transistor T18-6 may be turned on or turned off according to the voltage of the second control node QB. The 18$^{th}$-6 transistor T18-6 may be turned on when the second control node QB is set as the first level voltage, and may output the second voltage VGL1 as the p+5$^{th}$ gate signal GS[p+5] of the second level voltage.

The seventh sub-output circuit may include a 17$^{th}$-7 transistor T17-7 and an 18$^{th}$-7 transistor T18-7. The 17$^{th}$-7 transistor T17-7 may be connected between the 3$^{rd}$-7 clock terminal SCLK7 and the 1$^{st}$-7 output terminal OUT17. A gate of the 17$^{th}$-7 transistor T17-7 may be connected to the first control node Q. The 17$^{th}$-7 transistor T17-7 may be turned on or turned off according to the voltage of the first control node Q. The 17$^{th}$-7 transistor T17-7 may be turned on when the first control node Q is set as the first level voltage, and may output the seventh scan clock signal SC_CK7 of the first level voltage as the p+6$^{th}$ gate signal GS[p+6] of the first level voltage, or may output the seventh scan clock signal SC_CK7 of the second level voltage as the p+6$^{th}$ gate signal GS[p+6] of the second level voltage. The 18$^{th}$-7 transistor T18-7 may be connected between the 1$^{st}$-7 output terminal OUT17 and the second voltage input terminal V2. A gate of the 18$^{th}$-7 transistor T18-7 may be connected to the second control node QB. The 18$^{th}$-7 transistor T18-7 may be turned on or turned off according to the voltage of the second control node QB. The 18$^{th}$-7 transistor T18-7 may be turned on when the second control node QB is set as the first level voltage, and may output the second voltage VGL1 as the p+6$^{th}$ gate signal GS[p+6] of the second level voltage.

The eighth sub-output circuit may include a 17$^{th}$-8 transistor T17-8 and an 18$^{th}$-8 transistor T18-8. The 17$^{th}$-8 transistor T17-8 may be connected between the 3$^{rd}$-8 clock terminal SCLK8 and the 1$^{st}$-8 output terminal OUT18. A gate of the 17$^{th}$-8 transistor T17-8 may be connected to the first control node Q. The 17$^{th}$-8 transistor T17-8 may be turned on or turned off according to the voltage of the first control node Q. The 17$^{th}$-8 transistor T17-8 may be turned on when the first control node Q is set as the first level voltage, and may output the eighth scan clock signal SC_CK8 of the first level voltage as the p+7$^{th}$ gate signal GS[p+7] of the first level voltage, or may output the eighth scan clock signal SC_CK8 of the second level voltage as the p+7$^{th}$ gate signal GS[p+7] of the second level voltage. The 18$^{th}$-8 transistor T18-8 may be connected between the 1$^{st}$-8 output terminal OUT18 and the second voltage input terminal V2. A gate of the 18$^{th}$-8 transistor T18-8 may be connected to the second control node QB. The 18$^{th}$-8 transistor T18-8 may be turned on or turned off according to the voltage of the second control node QB. The 18$^{th}$-8 transistor T18-8 may be turned on when the second control node QB is set as the first level voltage, and may output the second voltage VGL1 as the p+7$^{th}$ gate signal GS[p+7] of the second level voltage.

The second output circuit 136 may output the first carry clock signal CR_CK1 or the third voltage VGL2 to the second output terminal OUT2 according to the voltages of the third control node QC and the second control node QB. The second output circuit 136 may include a nineteenth transistor T19 and a twentieth transistor T20 connected between the second clock terminal CCLK and the third voltage input terminal V3, and a third capacitor C3.

The nineteenth transistor T19 may be connected between the second clock terminal CCLK and the second output terminal OUT2. A gate of the nineteenth transistor T19 may be connected to the third control node QC. The nineteenth transistor T19 may be a pull-up transistor configured to transmit a first level voltage to an output terminal. The nineteenth transistor T19 may be turned on or turned off according to the voltage of the third control node QC. The nineteenth transistor T19 may be turned on when the third control node QC is set as the first level voltage, and may output the first carry clock signal CR_CK1 of the first level voltage as the $k^{th}$ carry signal CR[k] of the first level voltage, or may output the first carry clock signal CR_CK1 of the second level voltage as the $k^{th}$ carry signal CR[k] of the second level voltage.

The twentieth transistor T20 may be connected between the second output terminal OUT2 and the third voltage input terminal V3. A gate of the twentieth transistor T20 may be connected to the second control node QB. The twentieth transistor T20 may be a pull-down transistor configured to transmit a second level voltage to an output terminal. The twentieth transistor T20 may be turned on or turned off according to the voltage of the second control node QB. The twentieth transistor T20 may be turned on when the second control node QB is set as the first level voltage, and may output the third voltage VGL2 as the $k^{th}$ carry signal CR[k] of the second level voltage.

Hereinafter, an operation of the $k^{th}$ stage STK will be described in more detail with reference to FIGS. 12 and 13.

Figure 12:
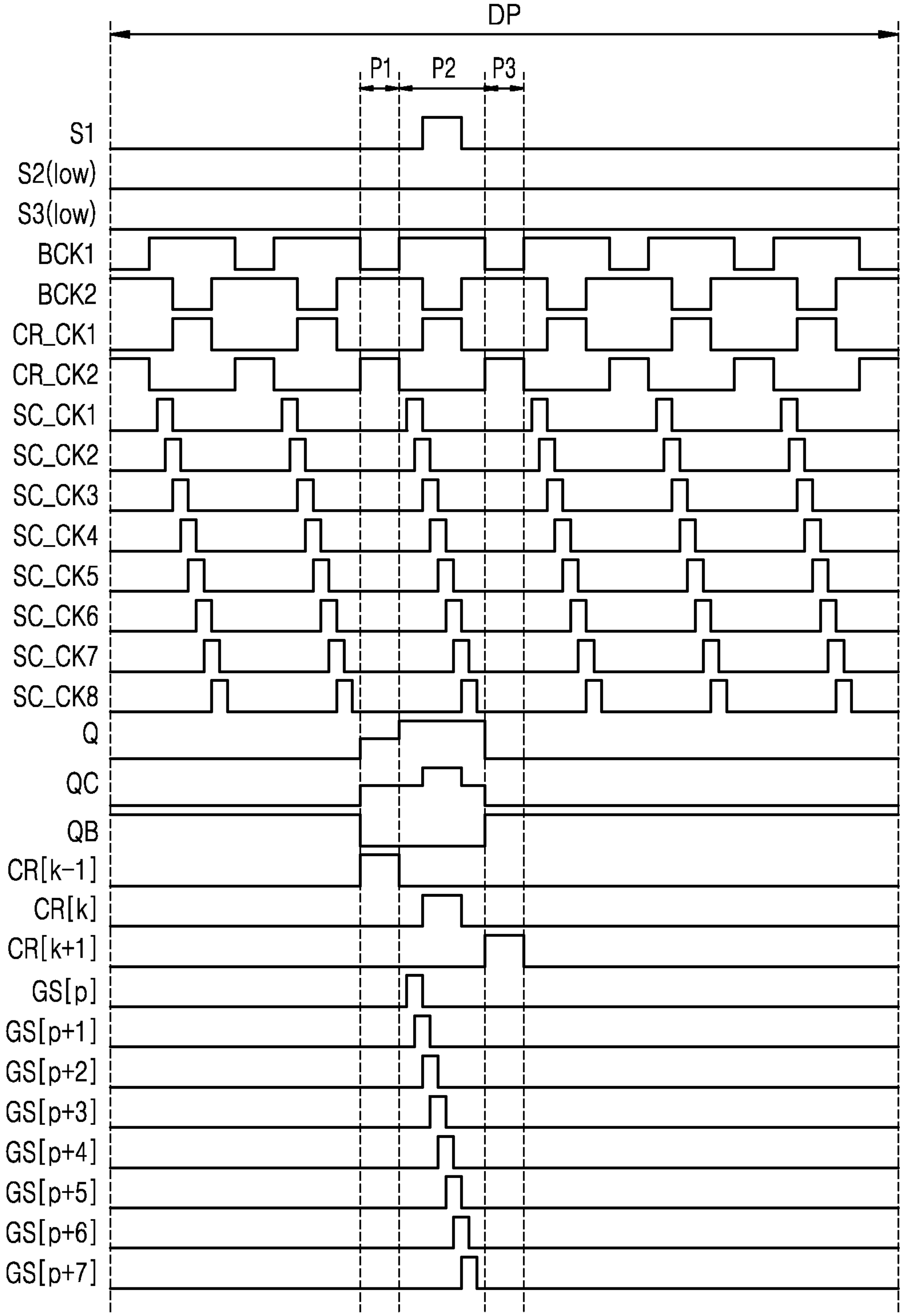
FIGS. 12 and 13 are diagrams showing signals of an operation of the stage of FIG. 10.
Figure 13:
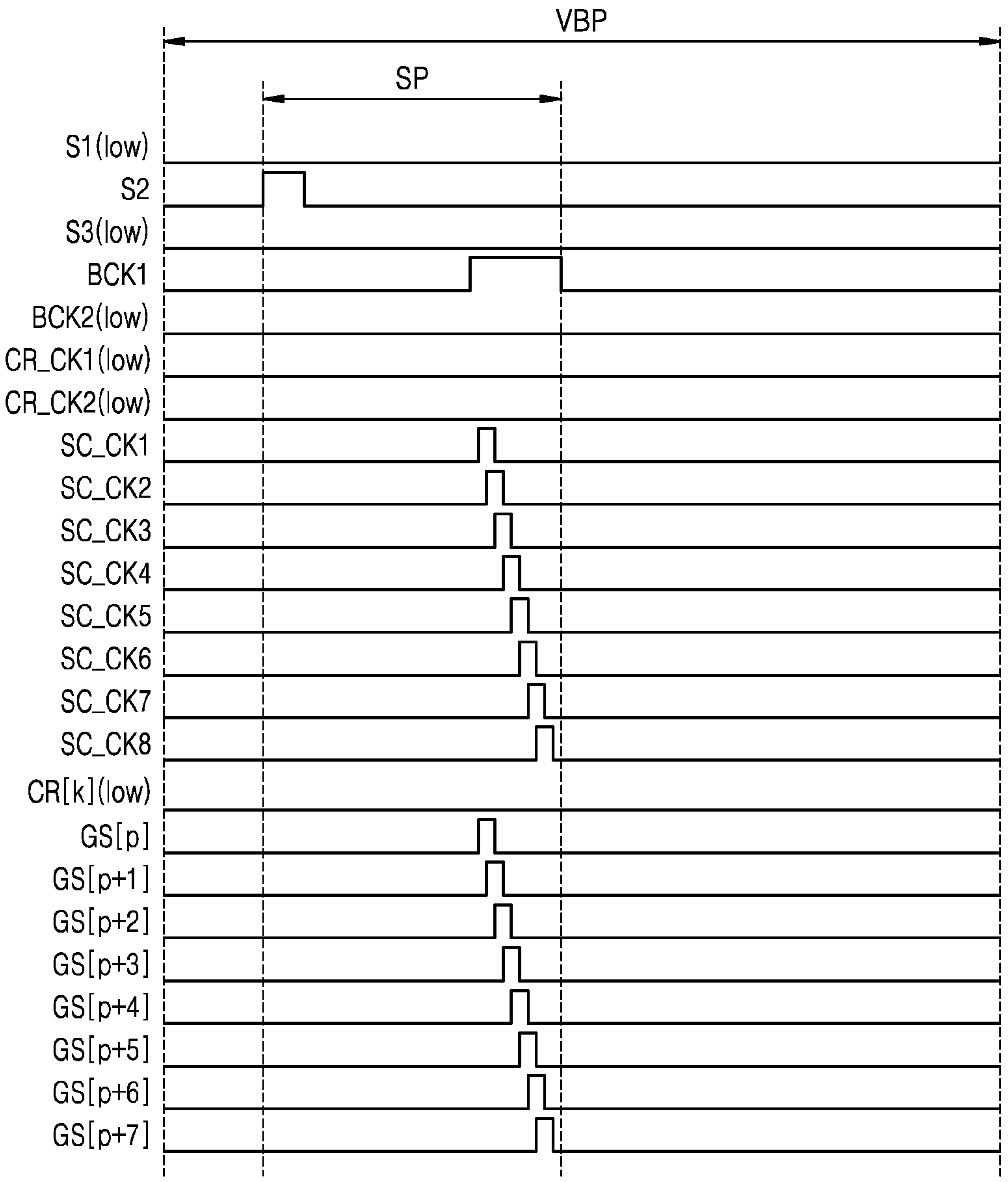

FIGS. 12 and 13 are diagrams showing signals of an operation of the stage of FIG. 10. FIG. 12 illustrates the operation of the $k^{th}$ stage STK during the display period DP.

Referring to FIGS. 10 and 12, during a first period P1, the previous carry signal CR[k−1] of the first level voltage may be supplied from the $k-1^{th}$ stage, which is the previous stage, as a start signal. From the $k+1^{th}$ stage, which is the next stage, the next carry signal CR[k+1] of the second level voltage may be supplied, the first boosting clock signal BCK1 of the second level voltage may be supplied, and the first carry clock signal CR_CK1 of the second level voltage may be supplied. Also, the first to eighth scan clock signals SC_CK1 to SC_CK8 of the second level voltage may be supplied.

The first transistor T1 and the eighth transistor T8 may be turned on by the previous carry signal CR[k−1] of the first level voltage. The first control node Q may be set as the first level voltage of the previous carry signal CR[k−1] by the turned-on first transistor T1. Accordingly, the $17^{th}$-1 to $17^{th}$-8 transistors T17-1 to T17-8 may be turned on, and the first to eighth scan clock signals SC_CK1 to SC_CK8 of the second level voltage may be output from the $1^{st}$-1 to $1^{st}$-8 output terminals OUT11 to OUT18, respectively, as the $p^{th}$ to $p+7^{th}$ gate signals GS[p] to GS[p+7] of the second level voltage. The third control node QC may be set as the first level voltage of the first voltage VGH by the turned-on eighth transistor T8. Accordingly, the nineteenth transistor T19 may be turned on, and the first carry clock signal CR_CK1 of the second level voltage may be output from the second output terminal OUT2 as the $k^{th}$ carry signal CR[k] of the second level voltage.

The fifth transistor T5, the gate of which is connected to the first control node Q, may be turned on, and the second control node QB may be set as the second level voltage of the third voltage VGL2. Accordingly, the $18^{th}$-1 to $18^{th}$-8 transistors T18-1 to T18-8, the sixteenth transistor T16, and the twentieth transistor T20 may be maintained to be turned off.

During a second period P2, the previous carry signal CR[k−1] of the second level voltage may be supplied, and the next carry signal CR[k+1] of the second level voltage may be supplied. The first boosting clock signal BCK1 and the first carry clock signal CR_CK1 of the first level voltage may be supplied, and the first to eighth scan clock signals SC_CK1 to SC_CK8 of the first level voltage may be sequentially supplied.

The first transistor T1 and the eighth transistor T8 may be turned off by the previous carry signal CR[k−1] of the second level voltage, and the first control node Q and the third control node QC may be maintained as the first level voltage.

Through the fifteenth transistor T15 that is turned on, the first boosting clock signal BCK1 of the first level voltage may be transmitted to the second node BN, and the voltage of the first control node Q may be boosted by the second capacitor C2 to be higher than the voltage of the first control node Q during the first period P1. Through the $17^{th}$-1 to $17^{th}$-8 transistors T17-1 to T17-8 that are turned on, the first to eighth scan clock signals SC_CK1 to SC_CK8 of the first level voltage may be output from the $1^{st}$-1 to $1^{st}$-8 output terminals OUT11 to OUT18, respectively, as the $p^{th}$ to $p+7^{th}$ gate signals GS[p] to GS[p+7] of the first level voltage. Also, through the nineteenth transistor T19 that is turned on, the first carry clock signal CR_CK1 of the first level voltage may be output from the second output terminal OUT2 as the $k^{th}$ carry signal CR[k] of the first level voltage.

Through the nineteenth transistor T19 that is turned on, the carry clock signal CR_CK1 of the first level voltage may be transmitted to the second output terminal OUT2, and the voltage of the third control node QC may be boosted by the third capacitor C3 to be higher than the voltage of the third control node QC during the first period P1. Also, the first carry clock signal CR_CK1 of the first level voltage may be output from the second output terminal OUT2 as the $k^{th}$ carry signal CR[k] of the first level voltage.

The second transistor T2 having the gate connected to the second node BN may be turned on, and the first voltage VGH may be transmitted to the first node H, and thus, the leakage current due to the first transistor T1, the third transistor T3, the fourth transistor T4, the ninth transistor T9, and the fourteenth transistor T14 (or the first transistor T1, the third transistor T3, the fourth transistor T4, the ninth transistor T9, the tenth transistor T10 and the fourteenth transistor T14) that are turned off may be prevented or substantially prevented. Therefore, the voltage level of the first control node Q and the third control node QC may be stably maintained.

The second control node QB may maintain the second level voltage of the third voltage VGL2 by the fifth transistor T5 that is turned on.

During a third period P3, the previous carry signal CR[k−1] of the second level voltage may be supplied, and the next carry signal CR[k+1] of the first level voltage may be supplied. The first boosting clock signal BCK1 and the first carry clock signal CR_CK1 of the second level voltage may be supplied, and the first to eighth scan clock signals SC_CK1 to SC_CK8 of the second level voltage may be supplied.

The fourth transistor T4 and the seventh transistor T7 may be turned on by the next carry signal CR[k+1] of the first level voltage.

The first control node Q may be set as the second level voltage of the third voltage VGL2 by the turned-on fourth transistor T4. Accordingly, the fifteenth transistor T15 and the $17^{th}$-1 to $17^{th}$-8 transistors T17-1 to T17-8 may be turned off. Also, the second transistor T2 having the gate connected to the second node BN may be turned off.

Through the turned on seventh transistor T7, the voltage of the second control node QB may be set as the first level voltage of the first voltage VGH. The ninth transistor T9, the gate of which is connected to the second control node QB, may be turned on, and the third control node QC may be set as the second level voltage of the third voltage VGL2. Accordingly, the nineteenth transistor T19 may be turned off.

The $18^{th}$-1 to $18^{th}$-8 transistors T18-1 to T18-8 having the gates connected to the second control node QB may be turned on, and the third voltage VGL2 may be output from the $1^{st}$-1 to $1^{st}$-8 output terminals OUT11 to OUT18 as the $p^{th}$ to $p+7^{th}$ gate signals GS[p] to GS[p+7] of the second level voltage. The twentieth transistor T20 having the gate connected to the second control node QB may be turned on, and the third voltage VGL2 may be output from the second output terminal OUT2 as the $k^{th}$ carry signal CR[k] of the second level voltage.

The sixth transistor T6 having the gate connected to the second control node QB may be turned on, and the first voltage VGH may be transmitted to the intermediate node of the $5^{th}$-1 transistor T5-1 and the $5^{th}$-2 transistor T5-2. Accordingly, the leakage current due to the $5^{th}$-1 transistor T5-1 and the $5^{th}$-2 transistor T5-2 that are turned off may be prevented or substantially prevented, and the voltage level of the second control node QB may be stably maintained.

The third transistor T3 having the gate connected to the second control node QB may be turned on, and the voltage of the first control node Q may be set as the third voltage VGL2.

The fourth transistor T4 having the gate connected to the second input terminal IN2 may be turned on, and the third voltage VGL2 of the second level voltage may be transmitted to the first control node Q. In other words, the $4^{th}$-1 transistor T4-1 and the $4^{th}$-2 transistor T4-2 may pull-down the boosted first control node Q and first node H to the second level voltage.

The $k^{th}$ carry signal CR[k] and the first control signal S1 may be supplied to the second control circuit 132 during the display period DP. When the first control signal S1 is supplied, the twelfth transistor T12 may be turned on, the $k^{th}$ carry signal CR[k] of the first level voltage may be supplied to the sensing node M, and the first capacitor C1 may be charged. The thirteenth transistor T13 having the gate connected to the sensing node M may be turned on.

FIG. 13 illustrates an operation of the $k^{th}$ stage STK during the vertical blank period VBP. A case where the pixels corresponding to the $k^{th}$ stage STK are sensed during the sensing period SP of the vertical blank period VBP is described in more detail with reference to FIG. 13 as an example.

Referring to FIGS. 10 and 13, during the sensing period SP, the first boosting clock signal BCK1 of the first level voltage may be supplied, the first carry clock signal CR_CK1 of the second level voltage may be supplied, and the first to eighth scan clock signals SC_CK1 to SC_CK8 of the first level voltage may be sequentially supplied.

The second control signal S2 may be supplied to the second control circuit 132, and the first control node Q may be set as the first voltage VGH through the thirteenth transistor T13 that is turned on with the gate thereof being connected to the sensing node M of the first level voltage and the fourteenth transistor T14 that is turned on by the second control signal S2. The first boosting clock signal BCK1 of the first level voltage may be transmitted to the second node BN through the fifteenth transistor T15 that is turned on, and the voltage of the first control node Q may be boosted by the second capacitor C2 to be higher than the first voltage VGH.

The $17^{th}$-1 to $17^{th}$-8 transistors T17-1 to T17-8 having the gates connected to the first control node Q may be turned on, and the first to eighth scan clock signals SC_CK1 to SC_CK8 of the first level voltage may be sequentially output from the $1^{st}$-1 to $1^{st}$-8 output terminals OUT11 to OUT18, respectively, as the $p^{th}$ to $p+7^{th}$ gate signals GS[p] to GS[p+7] of the first level voltage. The second transistor M2 (e.g. refer to FIG. 2) and the third transistor M3 (e.g. refer to FIG. 2) of each of the pixels PX (e.g. refer to FIG. 1) of the $p^{th}$ to $p+7^{th}$ rows receiving the $p^{th}$ to $p+7^{th}$ gate signals GS[p] to GS[p+7] may be turned on, and state information of the first transistor M1 (e.g. refer to FIG. 2) and the organic light-emitting diode OLED (e.g. refer to FIG. 2) may be sensed.

Figure 14:
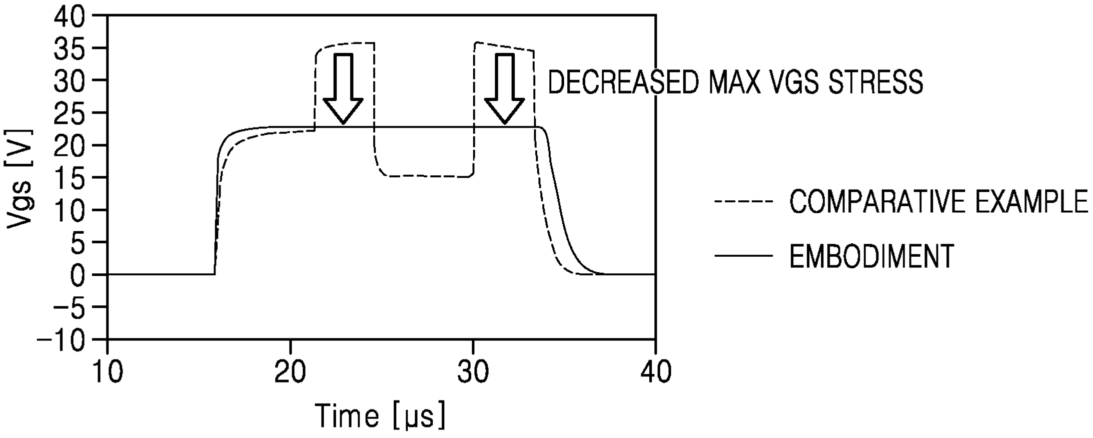
FIG. 14 is a diagram showing a gate-source voltage of a nineteenth transistor in a stage according to an embodiment.

FIG. 14 is a diagram showing a gate-source voltage (Vgs) of a nineteenth transistor in a stage according to an embodiment.

In FIG. 14, a graph according to a comparative example shows a gate-source voltage (Vgs) stress of the pull-up transistor PU2 in an example in which the pull-up transistor PU2 of the second output circuit OB2 configured to output a carry signal is connected to the first control node Q as illustrated in FIG. 5. In FIG. 14, a graph according to an embodiment shows a gate-source voltage (Vgs) stress of the nineteenth transistor T19 in an example in which the nineteenth transistor T19, which is the pull-up transistor of the second output circuit 136, is connected to the third control node QC separated from the first control node Q as illustrated in FIG. 10. Referring to FIG. 14, in the case of the gate driving circuit according to the embodiment, compared to the comparative example, the maximum gate-source voltage (Vgs) stress Max Vgs stress of the pull-up transistor may be reduced, and thus, long-term reliability may be obtained.

Figure 15:
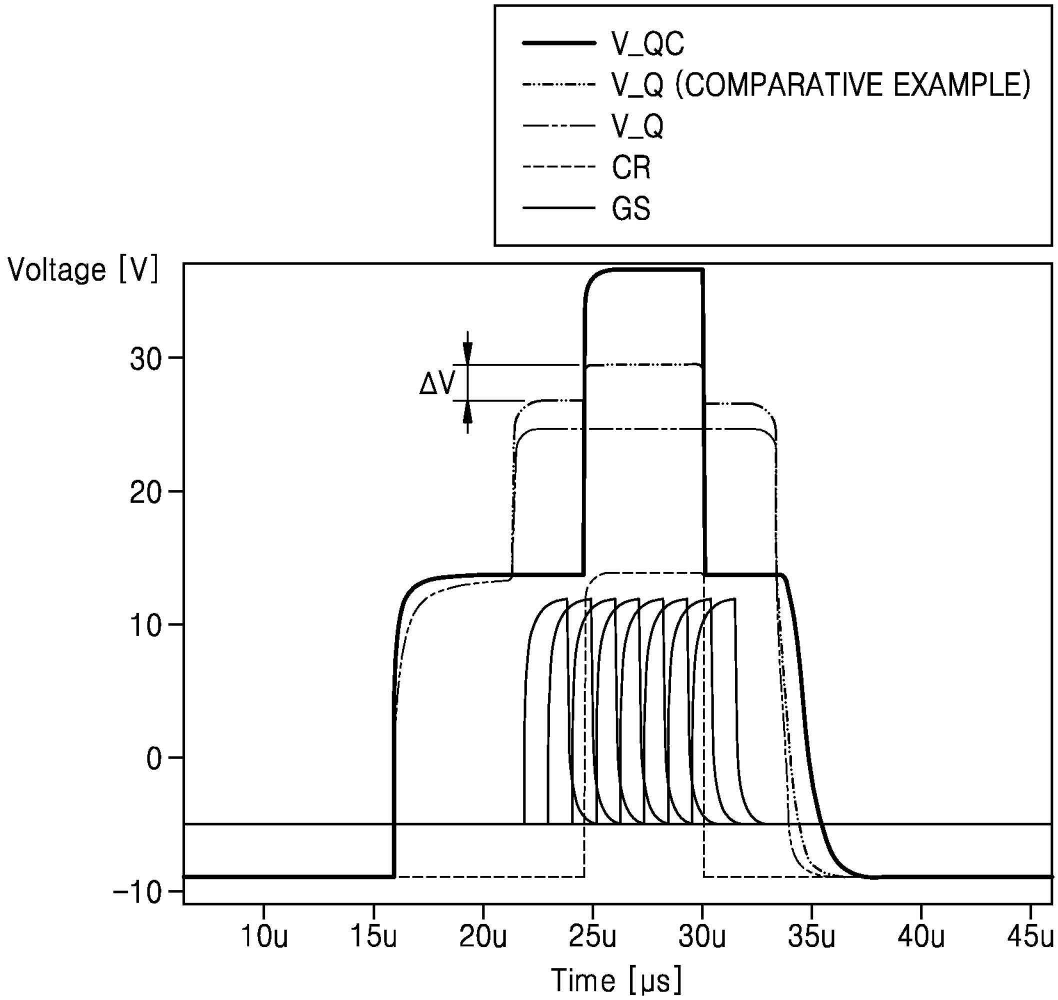
FIG. 15 is a diagram showing control nodes in a stage, a carry signal, and a gate signal according to an embodiment.

FIG. 15 is a diagram showing control nodes in a stage, a carry signal, and a gate signal according to an embodiment.

In FIG. 15, a comparative example shows that the pull-up transistor PU2 of the second output circuit OB2 configured to output the carry signal is connected to the first control node Q. Referring to FIG. 15, according to the comparative example, while a plurality of gate signals GS are being output from one stage, a difference ΔV may occur in a boosting level of a voltage V_Q of the first control node Q, due to the carry clock signal. Thus, in the comparative example, a deviation in the output of the gate signals GS may occur, and a horizontal stripe of a predetermined area may be generated in an image.

However, according to an embodiment, the first control node Q (e.g. refer to FIG. 10) and the third control node QC (e.g. refer to FIG. 10) may be separated from each other, and thus, there may be no effect of the carry clock signal on the first control node Q, so that a difference of the boosting level of the voltage V_Q of the first control node Q may be minimized or reduced. Accordingly, the gate signal GS and the carry signal CR may be stably output by the voltage V_Q of the first control node Q and a voltage V_QC of the third control node QC. Thus, the deviation between the plurality of gate signals GS output from one stage may be minimized or reduced.

Figure 16:
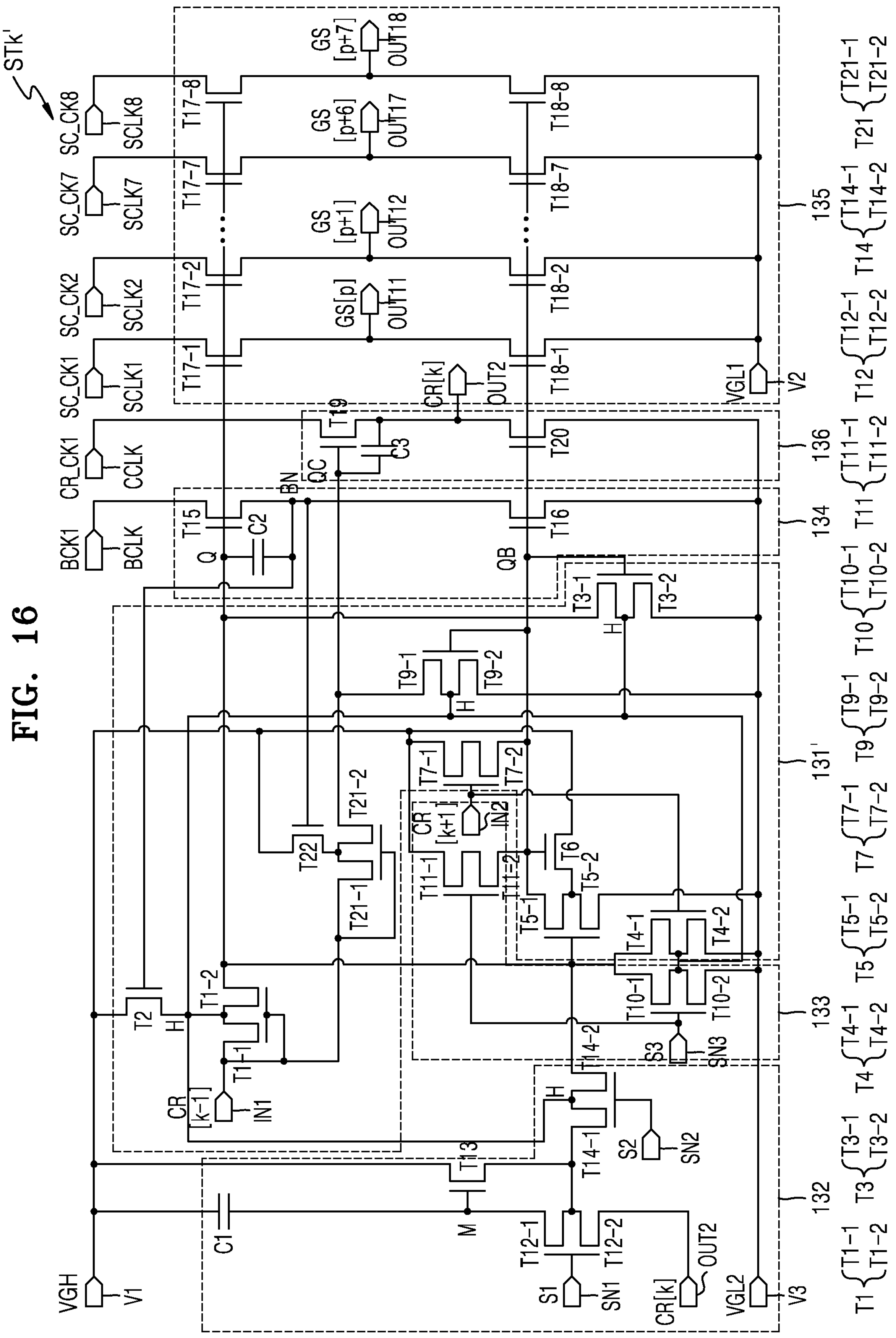
FIG. 16 is a circuit diagram of an example of a stage included in a gate driving circuit according to an embodiment.

FIG. 16 is a circuit diagram of an example of a stage included in a gate driving circuit according to an embodiment.

In a stage STK' illustrated in FIG. 16, a first control circuit 131' may include a twenty-first transistor T21 and a twenty-second transistor T22, instead of the eighth transistor T8 of the $k^{th}$ stage STK illustrated in FIG. 10. The other elements and structures and the operations of the stage STK' illustrated in FIG. 16 are the same or substantially the same as those described above for the $k^{th}$ stage STK illustrated in FIG. 10, and thus, redundant description thereof may not be repeated.

Referring to FIG. 16, the twenty-first transistor T21 may be connected between the first input terminal IN1 and the third control node QC. The twenty-first transistor T21 may include a plurality of sub-transistors that are serially connected. The sub-transistors may include a pair of $21^{st}$-1 transistor T21-1 and $21^{st}$-2 transistor T21-2. Gates of the $21^{st}$-1 transistor T21-1 and the $21^{st}$-2 transistor T21-2 may be connected to the first input terminal IN1. The $21^{st}$-1 transistor T21-1 and the $21^{st}$-2 transistor T21-2 may be turned on when a previous carry signal CR[k−1] is supplied, and may set a voltage of the third control node QC as the previous carry signal CR[k−1] of the first level voltage.

The twenty-second transistor T22 may be connected between the first voltage input terminal V1 and an intermediate node (e.g., a common electrode) between the $21^{st}$-1 transistor T21-1 and the $21^{st}$-2 transistor T21-2. A gate of the twenty-second transistor T22 may be connected to the second node BN. The twenty-second transistor T22 may be turned on when the second node BN is a first level voltage, and may set the intermediate node between the $21^{st}$-1 transistor T21-1 and the $21^{st}$-2 transistor T21-2 as the first voltage VGH.

According to one or more embodiments of the present disclosure, in each stage of the gate driving circuit, the control node (for example, the first control node Q) to which the gate of the pull-up transistor of the output circuit configured to output the gate signal is connected and the control node (for example, the third control node QC) to which the gate of the pull-up transistor of the output circuit configured to output the carry signal is connected may be separated from each other. Thus, the deviation between the plurality of gate signals that are output in each stage may be minimized or reduced.

One or more embodiments of the present disclosure include a gate driving circuit configured to stably output a gate signal, and a display apparatus including the gate driving circuit. However, the aspects and features of the present disclosure are not limited to those described above, and may be variously expanded within the spirit and scope of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A driving circuit comprising a plurality of stages, each of the plurality of stages comprising:

a first control circuit connected to a first voltage input terminal configured to receive a first voltage and a second voltage input terminal configured to receive a second voltage lower than the first voltage, the first control circuit being configured to control voltage levels of a first control node, a second control node, and a third control node;

a first output circuit connected to a first clock terminal and a third voltage input terminal configured to receive a third voltage, the first output circuit being configured to output a first output signal from a first output node according to the voltage levels of the first control node and the second control node;

a second output circuit connected to a second clock terminal and the second voltage input terminal, the second output circuit being configured to output a second output signal from a second output node according to the voltage levels of the third control node and the second control node; and a boosting circuit connected to a third clock terminal and the second voltage input terminal, the boosting circuit being configured to boost the voltage level of the first control node according to a signal input to the third clock terminal, wherein the second voltage is lower than the third voltage, wherein the third clock terminal is different from the second clock terminal, and wherein:

the first output circuit comprises a first pull-up transistor and a first pull-down transistor, a gate of the first pull-up transistor being connected to the first control node, and a gate of the first pull-down transistor being connected to the second control node; and the second output circuit comprises a second pull-up transistor and a second pull-down transistor, a gate of the second pull-up transistor being connected to the third control node different from the second output node, and a gate of the second pull-down transistor being connected to the second control node.

2. The driving circuit of claim 1, wherein the first control circuit comprises:

a first transistor connected to a first input terminal configured to receive a start signal and the first control node, the first transistor including a gate connected to the first input terminal;

a second transistor connected to the first control node and the second voltage input terminal, the second transistor including a gate connected to the second control node; and a third transistor connected to the first control node and the second voltage input terminal, the third transistor including a gate connected to a second input terminal configured to receive the second output signal that is output by a next stage from among the plurality of stages.

3. The driving circuit of claim 2, wherein the start signal is the second output signal that is output by a previous stage from among the plurality of stages.

4. The driving circuit of claim 1, wherein the first control circuit comprises:

a fourth transistor connected to the second control node and the second voltage input terminal, the fourth transistor including a gate connected to the first control node; and a fifth transistor connected to the first voltage input terminal and the second control node, the fifth transistor including a gate connected to a second input terminal configured to receive the second output signal that is output by a next stage from among the plurality of stages.

5. The driving circuit of claim 1, wherein the first control circuit comprises:

a sixth transistor connected to the first voltage input terminal and the third control node, the sixth transistor including a gate connected to a first input terminal configured to receive the second output signal that is output by a previous stage from among the plurality of stages; and a seventh transistor connected to the third control node and the second voltage input terminal, the seventh transistor including a gate connected to the second control node.

6. The driving circuit of claim 1, wherein the first control circuit comprises:

an eighth transistor comprising a first sub-transistor and a second sub-transistor connected in series between a first input terminal configured to receive the second output signal that is output by a previous stage from among the plurality of stages and the third control node, the first sub-transistor and the second sub-transistor including gates connected to the first input terminal;

a ninth transistor connected to an intermediate node between the first sub-transistor and the second sub-transistor of the eighth transistor and the first voltage input terminal, the ninth transistor including a gate connected to a node of the boosting circuit; and a tenth transistor connected to the third control node and the second voltage input terminal, the tenth transistor including a gate connected to the second control node.

7. The driving circuit of claim 1, wherein the boosting circuit comprises:

an eighth transistor connected to the third clock terminal and a first node, the eighth transistor including a gate connected to the first control node;

a ninth transistor connected to the first node and the second voltage input terminal, the ninth transistor including a gate connected to the second control node; and a first capacitor connected to the first control node and the first node.

8. The driving circuit of claim 1, wherein the first output circuit comprises a plurality of sub-output circuits configured to output a plurality of first output signals, wherein the first clock terminal of each of the plurality of sub-output circuits is configured to receive one of a plurality of first clock signals, and wherein the plurality of first clock signals have the same waveform as each other and have phases shifted by an interval from one another.

9. The driving circuit of claim 8, wherein a period during which a third clock signal that is input to the third clock terminal is a first level voltage overlaps with periods during which the plurality of first clock signals are the first level voltage.

10. The driving circuit of claim 1, wherein the second output circuit further comprises:

a second capacitor connected to the third control node and an output terminal configured to output the second output signal, and wherein:

the second pull-up transistor is connected to the second clock terminal and the output terminal; and the second pull-down transistor is connected to the output terminal and the second voltage input terminal.

11. The driving circuit of claim 1, wherein each of the plurality of stages further comprises a second control circuit connected to the first voltage input terminal and the first control node, the second control circuit being configured to control the voltage level of the first control node during a sensing period of a frame comprising a display period and the sensing period.

12. The driving circuit of claim 11, wherein the second control circuit comprises:

a second capacitor connected to the first voltage input terminal and a sensing node;

a twelfth transistor connected to the sensing node and an output terminal configured to output the second output signal, the twelfth transistor comprising a first sub-transistor and a second sub-transistor that are connected in series;

a thirteenth transistor connected to the first voltage input terminal and an intermediate node between the first sub-transistor and the second sub-transistor of the twelfth transistor, the thirteenth transistor including a gate connected to the sensing node; and a fourteenth transistor connected to the thirteenth transistor and the first control node.

13. The driving circuit of claim 12, wherein the twelfth transistor is configured to be turned on by a first control signal synchronized to the second output signal that is output during the display period, and set a voltage of the sensing node as a voltage of the second output signal.

14. The driving circuit of claim 12, wherein the fourteenth transistor is configured to be turned on by a second control signal that is input during the sensing period, and set a voltage of the first control node as the first voltage transmitted through the thirteenth transistor that is turned on.

15. The driving circuit of claim 1, wherein each of the plurality of stages further comprises:

a fifteenth transistor connected to the first control node and the second voltage input terminal, the fifteenth transistor including a gate connected to a terminal configured to receive a third control signal; and a sixteenth transistor connected to the first voltage input terminal and the second control node, the sixteenth transistor including a gate connected to the terminal configured to receive the third control signal.

16. A driving circuit comprising a plurality of stages, each of the plurality of stages comprising:

a first output circuit configured to output a first output signal, and comprising a first pull-up transistor and a first pull-down transistor, the first pull-up transistor including a gate connected to a first control node, and the first pull-down transistor including a gate connected to a second control node;

a second output circuit configured to output a second output signal, and comprising a second pull-up transistor and a second pull-down transistor, the second pull-up transistor including a gate connected to a third control node, and the second pull-down transistor including a gate connected to the second control node;

a boosting circuit configured to boost a voltage level of the first control node; and a control circuit configured to control the voltage level of the first control node, a voltage level of the second control node, and a voltage level of the third control node, the control circuit comprising:

a first transistor connected to a first input terminal configured to receive a start signal and the first control node, the first transistor including a gate connected to the first input terminal;

a second transistor connected to a first voltage input terminal configured to receive a first voltage and the second control node, the second transistor including a gate connected to a second input terminal configured to receive the second output signal that is output by a next stage from among the plurality of stages; and a third transistor connected to the first voltage input terminal and the third control node, the third transistor including a gate connected to the first input terminal.

17. The driving circuit of claim 16, wherein the control circuit further comprises:

a fourth transistor connected to the first control node and a second voltage input terminal configured to receive a second voltage lower than the first voltage, the fourth transistor including a gate connected to the second control node;

a fifth transistor connected to the first control node and the second voltage input terminal, the fifth transistor including a gate connected to the second input terminal;

a sixth transistor connected to the second control node and the second voltage input terminal, the sixth transistor including a gate connected to the first control node; and a seventh transistor connected to the third control node and the second voltage input terminal, the seventh transistor including a gate connected to the second control node.

18. A driving circuit comprising a plurality of stages, each of the plurality of stages comprising:

a first output circuit configured to output a first output signal, and comprising a first pull-up transistor and a first pull-down transistor, the first pull-up transistor including a gate connected to a first control node, and the first pull-down transistor including a gate connected to a second control node;

a second output circuit configured to output a second output signal, and comprising a second pull-up transistor and a second pull-down transistor, the second pull-up transistor including a gate connected to a third control node, and the second pull-down transistor including a gate connected to the second control node;

a boosting circuit configured to boost a voltage level of the first control node; and a control circuit configured to control the voltage level of the first control node, a voltage level of the second control node, and a voltage level of the third control node, the control circuit comprising:

a first transistor connected to a first input terminal configured to receive a start signal and the first control node, the first transistor including a gate connected to the first input terminal;

a second transistor connected to a first voltage input terminal configured to receive a first voltage and the second control node, the second transistor including a gate connected to a second input terminal configured to receive the second output signal that is output by a next stage from among the plurality of stages; and a third transistor connected to the first input terminal and the third control node, the third transistor including a gate connected to the first input terminal.

19. The driving circuit of claim 18, wherein the control circuit further comprises:

a fourth transistor connected to the first control node and a second voltage input terminal configured to receive a second voltage lower than the first voltage, the fourth transistor including a gate connected to the second control node;

a fifth transistor connected to the first control node and the second voltage input terminal, the fifth transistor including a gate connected to the second input terminal;

a sixth transistor connected to the second control node and the second voltage input terminal, the sixth transistor including a gate connected to the first control node; and a seventh transistor connected to the third control node and the second voltage input terminal, the seventh transistor including a gate connected to the second control node.

20. The driving circuit of claim 19, wherein each of the first transistor, the third transistor, and the sixth transistor comprises a first sub-transistor and a second sub-transistor that are connected in series, and wherein the control circuit further comprises:

an eighth transistor connected between the first voltage input terminal and an intermediate node between the first sub-transistor and the second sub-transistor of the first transistor, the eighth transistor including a gate connected to a node of the boosting circuit;

a ninth transistor connected between the first voltage input terminal and an intermediate node between the first sub-transistor and the second sub-transistor of the sixth transistor, the ninth transistor including a gate connected to the second control node; and a tenth transistor connected between the first voltage input terminal and an intermediate node between the first sub-transistor and the second sub-transistor of the third transistor, the tenth transistor including a gate connected to the node of the boosting circuit.

* * * * *